US009173049B2

(12) United States Patent
Chen et al.

(10) Patent No.: US 9,173,049 B2
(45) Date of Patent: Oct. 27, 2015

(54) METHOD, APPARATUS, AND SYSTEM FOR DATA TRANSMISSION

(75) Inventors: Xiaohong Chen, Kista (SE); Wei Wang, Shanghai (CN); Shaofeng Xu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 13/567,179

(22) Filed: Aug. 6, 2012

(65) Prior Publication Data

US 2013/0077604 A1    Mar. 28, 2013

Related U.S. Application Data

(63) Continuation of application No. PCT/CN2011/070894, filed on Feb. 9, 2011.

(30) Foreign Application Priority Data

Feb. 5, 2010    (CN) .......................... 2010 1 0108594

(51) Int. Cl.
*H04W 4/00*        (2009.01)
*H04W 88/08*       (2009.01)
*H04W 88/12*       (2009.01)

(52) U.S. Cl.
CPC .............. *H04W 4/00* (2013.01); *H04W 88/085* (2013.01); *H04W 88/12* (2013.01)

(58) Field of Classification Search
CPC ...... H04W 4/00; H04W 88/085; H04W 88/12
See application file for complete search history.

(56) References Cited

U.S. PATENT DOCUMENTS

2002/0128009 A1    9/2002  Boch et al. ................... 455/426
2003/0036410 A1*   2/2003  Judd et al. ................... 455/561
(Continued)

FOREIGN PATENT DOCUMENTS

CN    1816181      8/2006
CN    101083499    12/2007
(Continued)

OTHER PUBLICATIONS

Extended European Search Report issued Mar. 4, 2014, in corresponding European Patent Application No. 11739418.9.
(Continued)

*Primary Examiner* — Jung Park
(74) *Attorney, Agent, or Firm* — Staas & Halsey LLP

(57) ABSTRACT

The present invention provides a method, an apparatus and a system for data transmission. The method includes: receiving processed first microwave data information that is received through a microwave antenna; performing multiplexing through a preset rule on the first microwave data information and processed first radio frequency data information that is received through a base station antenna, and sending multiplexed information to a baseband unit, so that the baseband unit sends the first microwave data information to a microwave indoor unit. In the method, the apparatus and the system for data transmission, microwave data information and radio frequency data information are multiplexed, and then multiplexed information is transmitted together. The microwave data information can be transmitted through a transmission medium between base station devices, such as a fiber, thereby saving connection cables between microwave transmission devices and reducing a device cost and an installation cost of the microwave transmission devices.

18 Claims, 21 Drawing Sheets

(56) References Cited

U.S. PATENT DOCUMENTS

| | | | |
|---|---|---|---|
| 2008/0317464 A1 | 12/2008 | Li et al. | 398/43 |
| 2009/0075586 A1 | 3/2009 | Li et al. | |
| 2009/0290632 A1 | 11/2009 | Wegener | 375/240 |
| 2011/0091215 A1 | 4/2011 | Huang et al. | |

FOREIGN PATENT DOCUMENTS

| | | |
|---|---|---|
| CN | 101465705 | 6/2009 |
| EP | 2 110 955 A1 | 10/2009 |
| KR | 20080074557 | 8/2008 |

OTHER PUBLICATIONS

International Search Report, mailed May 26, 2011, in International Application No. PCT/CN2011/070894 (4 pp.).

International Search Report, dated May 26, 2011, in corresponding International Application No. PCT/CN2011/070894 (4 pp.).

Written Opinion of the International Searching Authority, dated May 26, 2011, in corresponding International Application No. PCT/CN2011/070894 (3 pp.).

Office Action, dated Dec. 5, 2012, in corresponding Chinese Application No. 201010108594.X (8 pp.).

\* cited by examiner

US 9,173,049 B2

METHOD, APPARATUS, AND SYSTEM FOR DATA TRANSMISSION

This application is a continuation of International Application No PCT/CN2011/070894, filed on Feb. 9, 2011, which claims priority to Chinese Patent Application No. 201010108594.X, filed on Feb. 5, 2010, all of which are hereby incorporated by reference in their entireties.

FIELD OF THE INVENTION

The embodiments of the present invention relates to a communication technology, and in particular, to a method, an apparatus, and a system for data transmission.

BACKGROUND OF THE INVENTION

A base station communicates with a base station controller through a microwave transmission device. The microwave transmission device is a signal transmission device which is used for connecting the base station and the base station controller. The existing microwave transmission device is a complete set of devices independent of a base station device. The microwave transmission device includes an outdoor unit (Outdoor Unit, hereinafter referred to as ODU) and an indoor unit (Indoor Unit, hereinafter referred to as IDU) which are independent of each other, and a connection cable which is used for connecting the ODU and the IDU. The ODU is installed on a tower, and the IDU is installed under the tower.

FIG. 1 is a schematic structural diagram of a microwave transmission device, a base station, and a base station controller in the prior art. As shown in FIG. 1, on the base station controller (Base Station Controller, hereinafter referred to as BSC) side, an ODU1 and an IDU1 of a microwave transmission device exist, where the IDU1 is connected to the BSC, and the ODU1 is connected to the IDU1 through a cable; on the base station side, an ODU2 and an IDU2 of a microwave transmission device exist, where the base station includes a remote radio unit (Remote Radio Unit, hereinafter referred to as RRU) and a baseband unit (Base Band Unit, hereinafter referred to as BBU), and the BBU is connected to the IDU2.

A process of communicating between the BSC and the base station through the microwave transmission device may be: The BSC sends the signal (which may include a service signal and a control signal) to be sent to the base station to the IDU1, the IDU1 transmits the signal to the ODU1 through the cable, and the ODU1 sends the signal out through a microwave antenna. The ODU2 receives the signal sent by the ODU1 through the microwave antenna, and then transmits the signal to the IDU2 through the cable. The IDU2 sends the signal to the BBU. In this way, the transmission of the signal from the BSC to the base station is implemented, where the BBU may communicate with the RRU through a fiber which connects them. Likewise, a process that the base station transmits the signal which is received through a base station antenna to the BSC is reverse to the foregoing communication process.

In a process of implementing the present invention, the inventor finds that at least the following problems exist in the prior art: The connection cable which is used for connecting the ODU and the IDU and is included in the existing microwave transmission device needs to be constructed and installed separately, which leads to a relatively high device cost and installation cost.

SUMMARY OF THE INVENTION

Embodiments of the present invention provide a method, an apparatus, and a system for data transmission which are used to solve a defect of a relatively high device cost and installation cost of a microwave transmission device in the prior art and realize a relatively low device cost and installation cost of the microwave transmission device.

An embodiment of the present invention provides a data transmission method, which includes:

obtaining processed first microwave data information that is received through a microwave antenna; and performing multiplexing through a preset rule on the first microwave data information and processed first radio frequency data information that is received through a base station antenna, and sending multiplexed information to a baseband unit, so that the baseband unit sends the first microwave data information or the processed first microwave data information to a microwave indoor unit.

An embodiment of the present invention further provides a data transmission method, which includes:

obtaining first microwave data information from the first microwave data information and first radio frequency data information which are sent by a remote radio unit and are multiplexed; and processing the first microwave data information so that a microwave indoor unit obtains first valid data information and first control information.

An embodiment of the present invention further provides a data transmission method, which includes:

obtaining second microwave data information; and performing multiplexing through a preset rule on the second microwave data information and second radio frequency data information to be sent to a remote radio unit, and sending multiplexed information to the remote radio unit, so that the remote radio unit sends the second microwave data information or processed second microwave data information to a microwave outdoor unit.

An embodiment of the present invention further provides a data transmission method, which includes:

obtaining second microwave data information from the second microwave data information and second radio frequency data information which are sent by a baseband unit and are multiplexed; and processing the second microwave data information so that a microwave outdoor unit obtains second valid data information and second control information.

An embodiment of the present invention provides a remote radio unit of a base station, where the remote radio unit includes a first downlink module and/or a first uplink module.

The first downlink module includes:

a first receiving module, configured to receive processed first microwave data information that is received through a microwave antenna; and a first sending and processing module, configured to perform multiplexing through a preset rule on the first microwave data information and processed first radio frequency data information that is received through a base station antenna, and send multiplexed information to a baseband unit, so that the baseband unit sends the first microwave data information or processed first microwave data information to a microwave indoor unit.

The first uplink module includes:

a first obtaining module, configured to obtain second microwave data information from the second microwave data information and second radio frequency data information which are sent by the baseband unit and are multiplexed; a second splitting module, configured to split the second microwave data information to obtain second control information and second digital valid data information; a first digital-to-analog converting module, configured to perform digital-toanalog conversion on the second digital valid data information to obtain second valid data information; and a first sending module, configured to send the second valid data information and the second control information to a microwave outdoor unit.

Alternatively, the first uplink module includes:
a second obtaining module, configured to obtain the second microwave data information from the second microwave data information and second radio frequency data information which are sent by the baseband unit and are multiplexed; and a second sending module, configured to process the second microwave data information so that a microwave outdoor unit obtains second valid data information and second control information.

An embodiment of the present invention provides a microwave outdoor unit, which includes a second downlink module and/or a second uplink module.

The second downlink module includes:
a frequency converting module, configured to perform frequency conversion processing on a microwave signal received through a microwave antenna, and then generate first valid data information;
a second analog-to-digital converting module, configured to perform analog-to-digital conversion on the first valid data information to obtain first digital valid data information; and
a second adapting and sending module, configured to perform compression and adaptation on the first digital valid data information and first control information to obtain first microwave data information, and send the first microwave data information to a remote radio unit of a base station, where the first control information is used to operate and maintain a microwave transmission device.

The second uplink module includes:
a third receiving module, configured to receive second microwave data information sent by the remote radio unit of the base station;
a third splitting module, configured to split the second microwave data information to obtain second control information and second digital valid data information; and
a second digital-to-analog converting module, configured to perform digital-to-analog conversion on the second digital valid data information to obtain second valid data information, where the second valid data information is used to be processed and then sent out through the microwave antenna.

An embodiment of the present invention provides a baseband unit of a base station, where the baseband unit includes a third downlink module and/or a third uplink module.

The third downlink module includes:
a first receiving and obtaining module, configured to obtain first microwave data information from the first microwave data information and first radio frequency data information which are received and multiplexed; a fourth splitting module, configured to split the first microwave data information to obtain first control information and first digital valid data information; a third digital-to-analog converting module, configured to perform digital-to-analog conversion on the first digital valid data information to obtain first valid data information; and a third sending module, configured to send the first valid data information and the first control information to a microwave indoor unit.

Alternatively, the third downlink module includes:
a second receiving and obtaining module, configured to obtain first microwave data information from first microwave data information and first radio frequency data information which are received and multiplexed; and a fourth sending module, configured to send the first microwave data information to a microwave indoor unit.

The third uplink module includes:
a fourth receiving module, configured to receive second microwave data information; and a first sending and processing module, configured to perform multiplexing through a preset rule on the second microwave data information and second radio frequency data information to be sent to a remote radio unit, and send multiplexed information to the remote radio unit, so that the remote radio unit sends the second microwave data information or processed second microwave data information to a microwave outdoor unit.

An embodiment of the present invention provides a microwave indoor unit, which includes a fourth downlink module and/or a fourth uplink module.

The fourth downlink module includes:
a sixth receiving module, configured to receive first microwave data information sent by a baseband unit;
a sixth splitting module, configured to split the first microwave data information to obtain first control information and first digital valid data information; and
a fourth digital-to-analog converting module, configured to perform digital-to-analog conversion on the first digital valid data information to obtain first valid data information, where the first valid data information is used to be processed and then sent to the baseband unit.

The fourth uplink module includes:
a fourth analog-to-digital converting module, configured to perform analog-to-digital conversion on second valid data information to obtain second digital valid data information; and
a fourth adapting and sending module, configured to perform compression and adaptation on the second digital valid data information and second control information to obtain second microwave data information, and send the second microwave data information to the baseband unit of a base station, where the second control information is used to operate and maintain a microwave transmission device.

An embodiment of the present invention further provides a data transmission system, which includes a remote radio unit of any base station provided in an embodiment of the present invention, a baseband unit of a base station, a microwave outdoor unit, and a microwave indoor unit.

An embodiment of the present invention further provides a data transmission system, which includes a remote radio unit of a base station, a baseband unit of the base station, a microwave outdoor unit, and a microwave indoor unit.

The remote radio unit of the base station is connected to the baseband unit of the base station and the microwave outdoor unit, respectively, and the microwave indoor unit is connected to the baseband unit of the base station;

The remote radio unit of the base station or the microwave outdoor unit includes a first downlink processing module and/or a first uplink processing module;

The first downlink processing module is configured to perform frequency conversion on a microwave signal received through a microwave antenna to generate first valid data information, perform analog-to-digital conversion on the first valid data information to obtain first digital valid data information, and perform compression and adaptation on the first digital valid data information and first control information to obtain first microwave data information;

The first uplink processing module is configured to split second microwave data information sent by the baseband unit of the base station to obtain second control information and second digital valid data information, and perform digital-to-analog conversion on the second digital valid data information to obtain second valid data information;

The baseband unit of the base station or the microwave indoor unit includes a second downlink processing module and/or a second uplink processing module;

The second downlink processing module is configured to split the first microwave data information sent by the remote radio unit of the base station to obtain the first control information and the first digital valid data information, and perform digital-to-analog conversion on the first digital valid data information to obtain the first valid data information sent by the microwave outdoor unit; and The second uplink processing module is configured to perform analog-to-digital conversion on the second valid data information to be sent to the microwave outdoor unit, obtain the second digital valid data information, and perform compression and adaptation on the second digital valid data information and the second control information to obtain the second microwave data information.

An embodiment of the present invention further provides a data transmission method, which includes:

receiving a microwave signal through a microwave antenna, and processing the microwave signal to obtain first valid data information;

receiving a radio frequency signal through a base station antenna, and processing the radio frequency signal to obtain first radio frequency data information; and performing analog-to-digital conversion on the first valid data information to obtain first digital valid data information, and performing compression and adaptation on the first digital valid data information and first control information to obtain first microwave data information, where the first control information is used to operate and maintain a microwave transmission device; performing multiplexing through a preset rule on the first microwave data information and the first radio frequency data information, and sending multiplexed information to a baseband unit, so that the baseband unit sends the first microwave data information or processed first microwave data information to a microwave indoor unit.

An embodiment of the present invention further provides a data transmission method, which includes:

obtaining second microwave data information and second radio frequency data information from the second microwave data information and the second radio frequency data information which are sent by a baseband unit and are multiplexed, and performing digital-to-analog conversion on second digital valid data information in the second microwave data information to obtain second valid data information, where the second microwave data information includes the second digital valid data information and second control information which is used to operate and maintain a microwave transmission device;

sending processed second radio frequency data information through a base station antenna; and sending the second valid data information through a microwave antenna.

An embodiment of the present invention further provides a data transmission apparatus, which includes a fifth downlink module and/or a fifth uplink module;

The fifth downlink module includes:

a first microwave outdoor subunit, configured to receive a microwave signal through a microwave antenna, and process the microwave signal to obtain first valid data information;

a first radio frequency submodule, configured to receive a radio frequency signal through a base station antenna, and process the radio frequency signal to obtain first radio frequency data information; and a first converting and processing submodule, configured to perform analog-to-digital conversion on the first valid data information received by the first microwave outdoor subunit to obtain first digital valid data information, and perform compression and adaptation on the first digital valid data information and first control information to obtain first microwave data information, where the first control information is used to operate and maintain a microwave transmission device; perform multiplexing through a preset rule on the first microwave data information and the first radio frequency data information, and send multiplexed information to a baseband unit, so that the baseband unit sends the first microwave data information or processed first microwave data information to a microwave indoor unit;

The fifth uplink module includes:

a second converting and processing submodule, configured to obtain second microwave data information and second radio frequency data information from the second microwave data information and the second radio frequency data information which are sent by the baseband unit and are multiplexed, where the second microwave data information includes second digital valid data information and second control information which is used to operate and maintain the microwave transmission device; and perform digital-to-analog conversion on the second digital valid data information to obtain second valid data information;

a second radio frequency submodule, configured to send processed second radio frequency data information through the base station antenna; and a second microwave outdoor subunit, configured to send processed second valid data information through the microwave antenna.

An embodiment of the present invention further provides a data transmission method, which includes:

receiving a microwave signal through a microwave antenna, and processing the microwave signal to obtain first valid data information;

demodulating the first valid data information into first base station data information which is used to be sent to a baseband unit;

receiving a radio frequency signal through a base station antenna, and processing the radio frequency signal to obtain first radio frequency data information; and performing multiplexing through a preset rule on the first base station data information and the first radio frequency data information, and sending multiplexed information to the baseband unit.

An embodiment of the present invention further provides a data transmission method, which includes:

receiving, by a baseband unit, first base station data information which is from a network side and is multiplexed with first radio frequency data information from a user equipment; and performing, by the baseband unit, demultiplexing on the first base station data information and the first radio frequency data information which are multiplexed, to obtain the first base station data information and the first radio frequency data information.

An embodiment of the present invention further provides a data transmission method, which includes:

performing, by a baseband unit, multiplexing through a preset rule on second base station data information to be sent to a network side and second radio frequency data information to be sent to a user equipment, and sending multiplexed information to a remote device, so that the remote device sends processed second radio frequency data information to the user equipment through a base station antenna and sends processed second base station data information to the network side through a microwave antenna.

An embodiment of the present invention further provides a data transmission method, which includes:

receiving second base station data information and second radio frequency data information which are sent by a baseband unit and are multiplexed; and performing demultiplexing on the second base station data information and the second radio frequency data information which are multiplexed, to obtain the second base station data information and the second radio frequency data information;

modulating the second base station data information to generate second data information;

sending processed second data information through a microwave antenna; and sending processed second radio frequency data information through a base station antenna.

An embodiment of the present invention further provides a data transmission apparatus, which includes a sixth downlink module and/or a sixth uplink module;

The sixth downlink module includes:

a third microwave outdoor subunit, configured to receive a microwave signal through a microwave antenna, and process the microwave signal to obtain first valid data information;

a third microwave indoor subunit, configured to modulate the first valid data information received by the third microwave outdoor subunit into first base station data information which is used to be sent to a baseband unit;

a third radio frequency submodule, configured to receive a radio frequency signal through a base station antenna, and process the radio frequency signal to obtain first radio frequency data information; and a third converting and processing submodule, configured to perform multiplexing through a preset rule on the first base station data information obtained by the third microwave indoor subunit and the first radio frequency data information obtained by the third radio frequency submodule, and send multiplexed information to the baseband unit;

The sixth uplink module includes:

a fourth converting and processing submodule, configured to receive second base station data information and second radio frequency data information which are sent by the baseband unit and are multiplexed; and demultiplex the second base station data information and the second radio frequency data information which are multiplexed, to obtain the second base station data information and the second radio frequency data information;

a fourth microwave indoor subunit, configured to modulate the second base station data information to generate second data information;

a fourth microwave outdoor subunit, configured to send processed second data information through the microwave antenna; and a fourth radio frequency submodule, configured to send processed second radio frequency data information through the base station antenna.

An embodiment of the present invention further provides a baseband unit of a base station, where the baseband unit includes a seventh downlink module and/or a seventh uplink module.

The seventh downlink module includes:

a seventh receiving module, configured to receive first base station data information which is from a network side and is multiplexed with first radio frequency data information from a user equipment; and a demultiplexing module, configured to demultiplex the first base station data information and the first radio frequency data information which are received by the seventh receiving module and are multiplexed, to obtain the first base station data information and the first radio frequency data information;

The seventh uplink module includes:

a multiplexing module, configured to perform multiplexing through a preset rule on second base station data information to be sent to the network side and second radio frequency data information to be sent to the user equipment, and send multiplexed information to a remote device.

An embodiment of the present invention further provides a base station device, which includes a device on a tower and a device under the tower;

The device on the tower includes a remote radio unit and a microwave outdoor unit, and the device under the tower includes a baseband unit and a microwave indoor unit; the device on the tower is connected to the baseband unit, and the baseband unit is connected to the microwave indoor unit;

The device on the tower further includes a third downlink processing module and/or a third uplink processing module;

The third downlink processing module is configured to multiplex a signal to be sent by the microwave outdoor unit to the microwave indoor unit and a signal to be sent by the remote radio unit to the baseband unit, and send multiplexed signals to the baseband unit;

The third uplink processing module is configured to demultiplex multiplexed signals sent by the baseband unit, where the multiplexed signals are obtained by multiplexing a signal to be transmitted through a microwave antenna and a signal to be transmitted through a base station antenna, and send the obtained signal to be transmitted through the microwave antenna and the obtained signal to be transmitted through the base station antenna, to the microwave outdoor unit and the remote radio unit, respectively;

The baseband unit includes a fourth downlink processing module and/or a fourth uplink processing module;

The fourth downlink processing module is configured to demultiplex a signal to be sent to the microwave indoor unit and a signal to be sent to the baseband unit, where the signals are sent by the device on the tower, and obtain a signal to be sent to the microwave indoor unit; and The fourth uplink processing module is configured to multiplex the signal to be transmitted through the microwave antenna and the signal to be transmitted through the base station antenna, and send multiplexed signals to the device on the tower.

An embodiment of the present invention further provides a base station device, which includes a device on a tower and a device under the tower;

The device on the tower includes a remote radio unit, a microwave outdoor unit, and a microwave indoor unit; the device under the tower includes a baseband unit, and the device on the tower is connected to the baseband unit;

The device on the tower further includes a fifth downlink processing module and/or a fifth uplink processing module;

The fifth downlink processing module is configured to multiplex a base station data signal to be sent by the microwave indoor unit to the baseband unit and a radio frequency signal to be sent by the remote radio unit to the baseband unit, and then send multiplexed signals to the baseband unit;

The fifth uplink processing module is configured to demultiplex multiplexed signals sent by the baseband unit, where the multiplexed signals are obtained by multiplexing a signal to be transmitted through a microwave antenna and a signal to be transmitted through a base station antenna, and send the obtained signal to be transmitted through the microwave antenna and the obtained signal to be transmitted through the base station antenna, to the microwave indoor unit and the remote radio unit, respectively;

The baseband unit further includes a sixth downlink processing module and/or a sixth uplink processing module; and The sixth downlink processing module is configured to demultiplex a base station data signal and a radio frequency signal that are sent by the fifth downlink processing module and are multiplexed; and the sixth uplink processing module is configured to multiplex a signal to be transmitted through the microwave antenna and a signal to be transmitted through the base station antenna, and send multiplexed signals to the fifth uplink processing module.

The method, the apparatus and the system for data transmission in the embodiments of the present invention multiplex the microwave data information and the radio frequency data information, and then transmit multiplexed information together. In this way, microwave data information can be transmitted through a transmission medium between base station devices, such as a fiber, thereby saving the connection cables between the microwave transmission devices and reducing the device cost and the installation cost of the microwave transmission device.

BRIEF DESCRIPTION OF THE DRAWINGS

To illustrate the technical solutions of the embodiments of the present invention more clearly, the accompanying drawings required for describing the embodiments are introduced briefly in the following. Apparently, the accompanying drawings in the following descriptions are merely some of the embodiments of the present invention, and persons of ordinary skill in the art can further obtain other drawings according to these accompanying drawings without creative efforts.

DETAILED DESCRIPTION OF THE EMBODIMENTS

To make the objectives, the technical solutions, and the advantages of the embodiments of the present invention clearer, the technical solutions in the embodiments of the present invention are clearly and completely described in the following with reference to the accompanying drawings in the embodiments of the present invention. Apparently, the described embodiments are a part of embodiments of the present invention, rather than all embodiments. Based on the embodiments of the present invention, all other embodiments obtained by persons of ordinary skill in the art without making any creative effort shall fall within the protection scope of the present invention.

A microwave transmission device may include an ODU on a tower and an IDU under the tower; and a base station includes an RRU which is located on the tower and a BBU which is located under the tower. For the microwave transmission device and the base station, their structures are basically similar, including one part on the tower and one part under the tower. An embodiment of the present invention provides a data transmission solution which enables that the IDU and the ODU in the microwave transmission device adjacent to the base station can perform data transmission through a fiber between base station devices. In this way, a connection cable in the microwave transmission device and corresponding engineering and installation expenses are saved, and a total cost of a system is reduced. The data transmission between microwave transmission devices has the following two cases. A first case is: Data is transmitted from a microwave ODU to a microwave IDU. In this case, the microwave ODU processes a microwave signal received through a microwave antenna, and then transmits the processed microwave signal to the microwave IDU. A second case is: The data is transmitted from the microwave IDU to the microwave ODU. In this case, the microwave IDU transmits a signal received from the base station (Base Station, hereinafter referred to as BS) to the ODU. Detailed description is given in the following through a specific embodiment.

Figure 1:
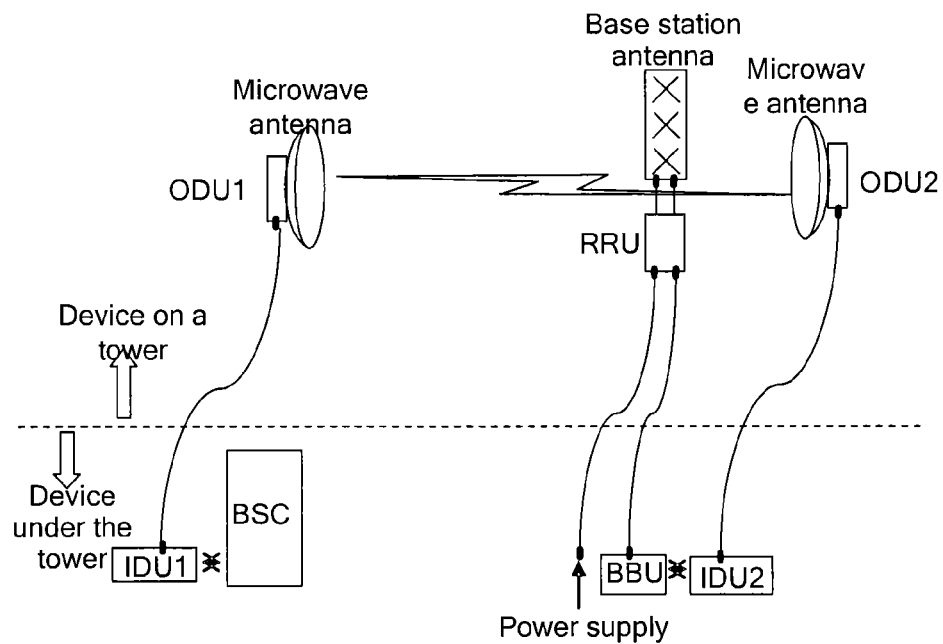
FIG. 1 is a schematic structural diagram of a microwave transmission device, a base station, and a base station controller in the prior art.
Figure 2:
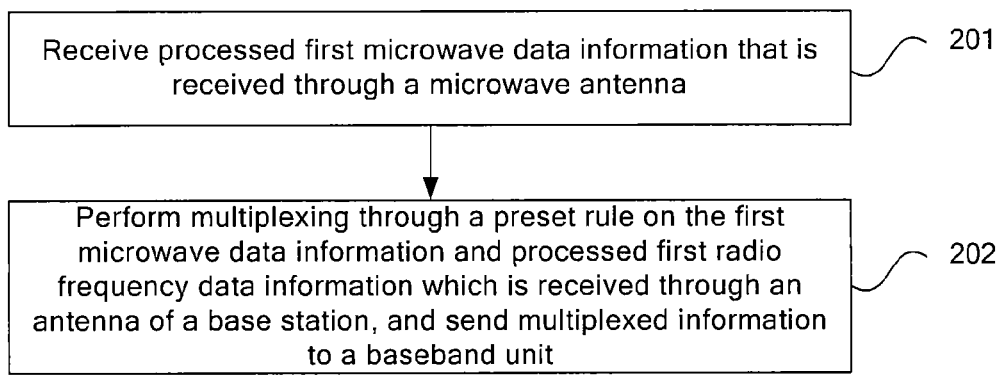
FIG. 2 is a flow chart of a first embodiment of a data transmission method according to the present invention.

FIG. 2 is a flow chart of a first embodiment of a data transmission method according to the present invention. This embodiment is applicable to a case that the data is transmitted from the microwave ODU to the microwave IDU. As shown in FIG. 2, the method includes:

Step 201: Receive processed first microwave data information that is received through the microwave antenna.

In this embodiment, the data transmitted in the fiber may include two types: one type is data transmitted between the RRU and the BBU of the base station, and the data is referred to as radio frequency data information in each embodiment of the present invention; and the other type is data transmitted between the microwave ODU and the microwave IDU, and the data is referred to as microwave data information in each embodiment of the present invention. In the RRU of an existing base station, a analog transceiver completes receiving and sending of a base station signal; a digital intermediate frequency processing module converts the base station signal into a digital signal through an analog-to-digital converter, and then converts the digital signal into a baseband signal, and then the baseband signal is sent through an interface processing module to the BBU, so as to implement interconnection between the RRU and the BBU.

To enable that the microwave ODU and the microwave IDU can perform data transmission through the fiber between base stations, it is necessary to perform certain format conversion and adaptation processing on the data received by the microwave ODU through the microwave antenna to obtain microwave data information, so that the microwave data information can be transmitted through the fiber together with the radio frequency data information transmitted between base stations. The microwave data information may be obtained in two manners. One manner is: The RRU of the base station performs conversion and adaptation processing on received data information which is sent by the microwave ODU, to obtain microwave data information. The other manner is: The microwave ODU performs conversion and adaptation processing on the data information to be sent to the microwave IDU, to obtain microwave data information, and then sends the microwave data information to the RRU of the base station.

Step 202: Perform multiplexing through a preset rule on first microwave data information and processed first radio frequency data information that is received through a base station antenna, and send multiplexed information to the baseband unit, so that the baseband unit sends the first microwave data information to the microwave indoor unit.

A radio frequency signal may be received through the base station antenna, and the radio frequency signal is processed to generate radio frequency data information, where the radio frequency data information may be transmitted through the fiber between the RRU and the BBU. In this embodiment, the baseband unit is the BBU. The RRU performs multiplexing through a preset rule on the radio frequency data information and the microwave data information obtained in step 201, and then multiplexed information can be sent together to the BBU; the preset rule may be a preset time division multiplexing rule, for example, the RRU transmits the microwave data information together with the radio frequency data information to the BBU through the fiber in a time division multiplexing manner; through multiplexing the radio frequency data information and the microwave data information, the radio frequency data information and the microwave data information can be transmitted in a same transmission medium, for example, transmitting both information through one fiber simultaneously.

After receiving the microwave data information and the radio frequency data information, the BBU demultiplexer the information according to a preset rule to obtain the microwave data information, and then sends the microwave data information to the microwave IDU to complete data transmission between the microwave ODU and the microwave IDU.

In the data transmission method in this embodiment, the microwave data information and the radio frequency data information are multiplexed, and the multiplexed information are transmitted together. In this way, the microwave data information can be transmitted through the fiber between base station devices, thereby saving the connection cable between the microwave transmission devices and reducing a device cost and an installation cost of the microwave transmission device.

Figure 3:
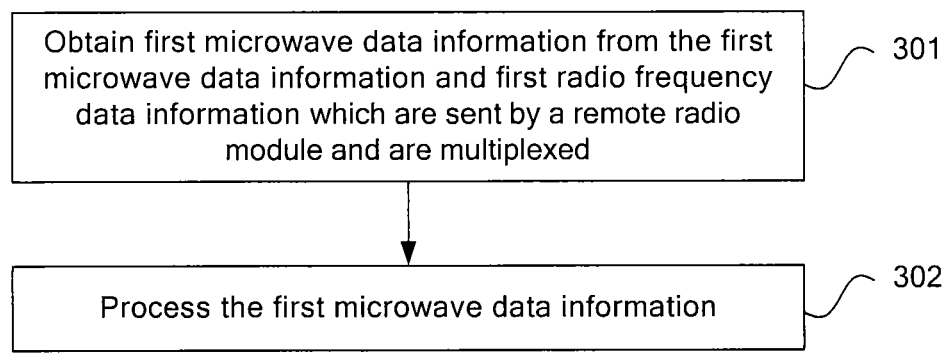
FIG. 3 is a flow chart of a second embodiment of a data transmission method according to the present invention.

FIG. 3 is a flow chart of a second embodiment of a data transmission method according to the present invention. This embodiment is applicable to a case that data is transmitted from a microwave ODU to a microwave IDU. As shown in FIG. 3, the method specifically includes:

Step 301: Obtain first microwave data information from the first microwave data information and first radio frequency data information which are sent by a remote radio unit and are multiplexed.

A baseband unit, namely, the BBU, receives the first microwave data information and the first radio frequency data information which are sent by an RRU, where the first microwave data information and the first radio frequency data information may be sent together by the RRU through a transmission medium such as a fiber in a multiplexing manner; after receiving the first microwave data information and the first radio frequency data information which are sent by the RRU and are multiplexed, the BBU may perform demultiplexing according to a preset rule to obtain the first microwave data information from it.

Step 302: Process the first microwave data information so that the microwave indoor unit obtains first valid data information and first control information in the first microwave data information.

The BBU processes the obtained first microwave data information and the processing may be performed in two manners. One manner is: The BBU processes the first microwave data information into the first valid data information and the first control information, and then sends the first valid data information and the first control information to the IDU. The other manner is: The BBU sends the first microwave data information to the IDU, so that the IDU processes the first microwave data information into the first valid data information and the first control information.

In the data transmission method in this embodiment, the microwave data information and the radio frequency data information which are multiplexed and transmitted together are received. In this way, the microwave data information can be transmitted through the fiber between base station devices, thereby saving a connection cable between microwave transmission devices and reducing a device cost and an installation cost of a microwave transmission device.

Figure 4:
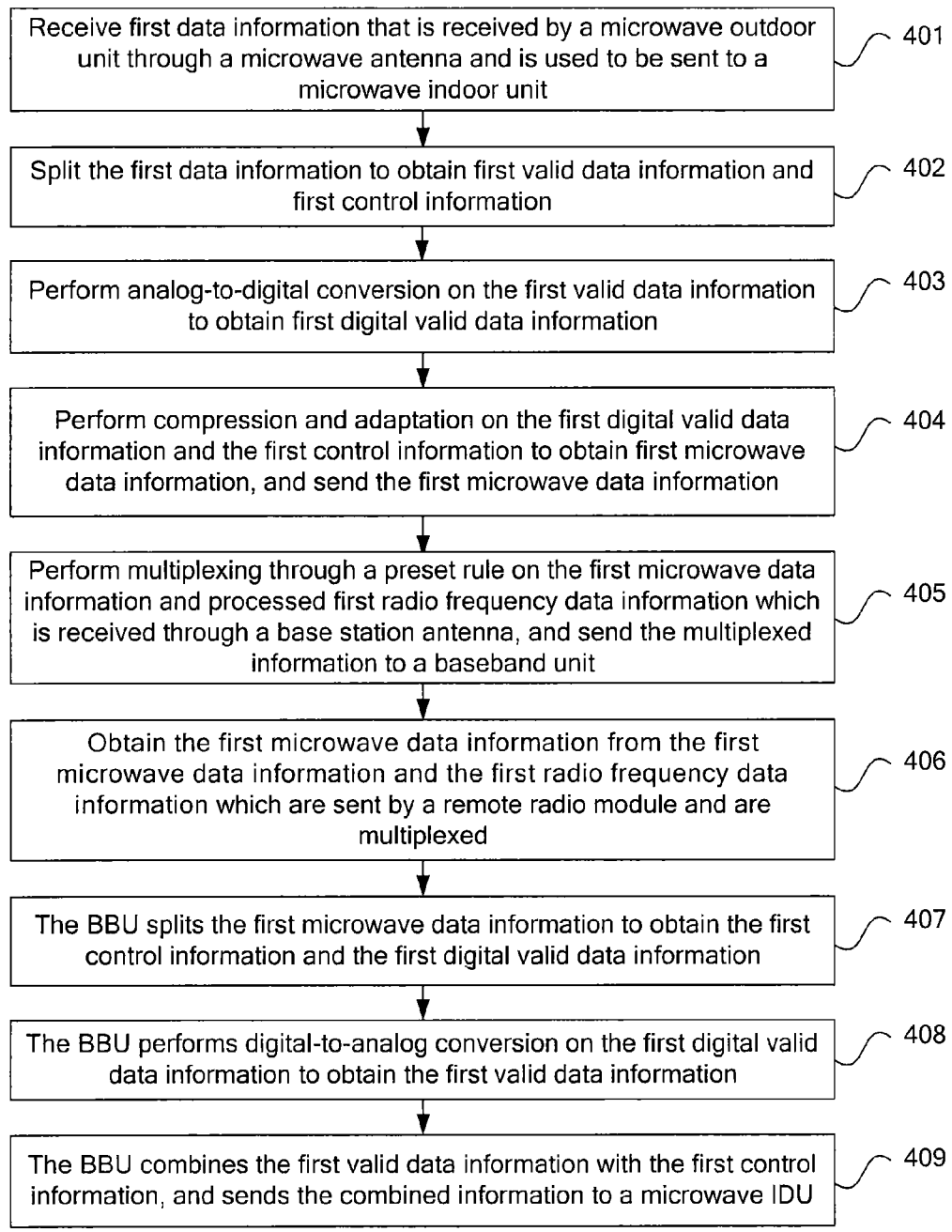
FIG. 4 is a flow chart of a third embodiment of a data transmission method according to the present invention.

FIG. 4 is a flow chart of a third embodiment of a data transmission method according to the present invention. As shown in FIG. 4, on the basis of a first method embodiment and a second method embodiment, the method specifically includes:

Step 401: Receive first data information that is received by a microwave outdoor unit through a microwave antenna and is used to be sent to a microwave indoor unit.

The microwave ODU receives a microwave signal through the microwave antenna, and the microwave information is processed through an analog transceiver. For example, the microwave signal is processed through the analog transceiver into an intermediate frequency (Intermediate frequency, hereinafter referred to as IF) signal, and then the IF signal and first control information may be combined to generate the first data information, and sends the first data information to an RRU. The first control information is used to operate and maintain a microwave transmission device, namely, it is used to perform function configuration, state monitoring and maintenance on the microwave transmission device. The first data information is sent by the microwave ODU through the RRU to the microwave IDU. The RRU receives the first data information sent by the microwave ODU.

Step 402: Split the first data information to obtain first valid data information and the first control information. The first data information includes the first valid data information and the first control information which is used to operate and maintain the microwave transmission device.

In this embodiment, the first valid data information is the foregoing IF signal. The RRU splits the received first data information to obtain the IF signal and the first control information. The microwave ODU and the RRU are connected through a cable to transmit data to each other. The first control information may be a digital signal.

Step 403: Perform analog-to-digital conversion on the first valid data information to obtain first digital valid data information.

The RRU performs analog-to-digital conversion on the separated IF signal to obtain the first digital valid data information.

Step 404: Perform compression and adaptation on the first digital valid data information and the first control information to obtain first microwave data information, and send the first microwave data information.

The RRU compresses and combines the first digital valid data information and the first control information, and performs adaptation processing on the combined signals so that the obtained first microwave data information can be transmitted through a fiber between the RRU and the BBU, and then the first microwave data information is transmitted to a processing module in the RRU.

Step 405: Perform multiplexing through a preset rule on the first microwave data information and processed first radio frequency data information which is received through a base station antenna, and send the multiplexed information to the baseband unit.

The processing module in the RRU may transmit the first microwave data information together with the first radio frequency data information to the BBU through the fiber in a time division multiplexing manner.

Step 406: The baseband unit obtains the first microwave data information from the first microwave data information and the first radio frequency data information which are sent by a remote radio unit and are multiplexed.

The BBU demultiplexer the information received from the RRU according to a preset rule to obtain the first microwave data information.

Step 407: The BBU splits the first microwave data information to obtain the first control information and the first digital valid data information.

Step 408: The BBU performs digital-to-analog conversion on the first digital valid data information to obtain the first valid data information.

Step 409: The BBU combines the first valid data information with the first control information, and sends the combined information to the microwave IDU. In this way, the data transmission from the microwave ODU to the microwave IDU is completed.

In step 407 to step 409, the BBU processes the first microwave data information into the first valid data information (namely, the IF signal) and the first control information. In another implementation manner of the embodiment of the present invention, after obtaining the first microwave data information, the BBU may send the first microwave data information to the microwave IDU directly, and the IDU processes the first microwave data information to obtain the IF signal and the first control information.

In addition, the microwave ODU needs a power supply to provide electricity. Because the microwave ODU is connected to the RRU through a cable in this embodiment of the present invention, the microwave ODU can share the power supply with the RRU.

In the data transmission method in this embodiment, the microwave data information and the radio frequency data information are multiplexed, and the multiplexed information is transmitted. In this way, the microwave data information can be transmitted through the fiber between base station devices, thereby saving the connection cable between the microwave transmission devices and reducing a device cost and an installation cost of the microwave transmission device.

Figure 5:
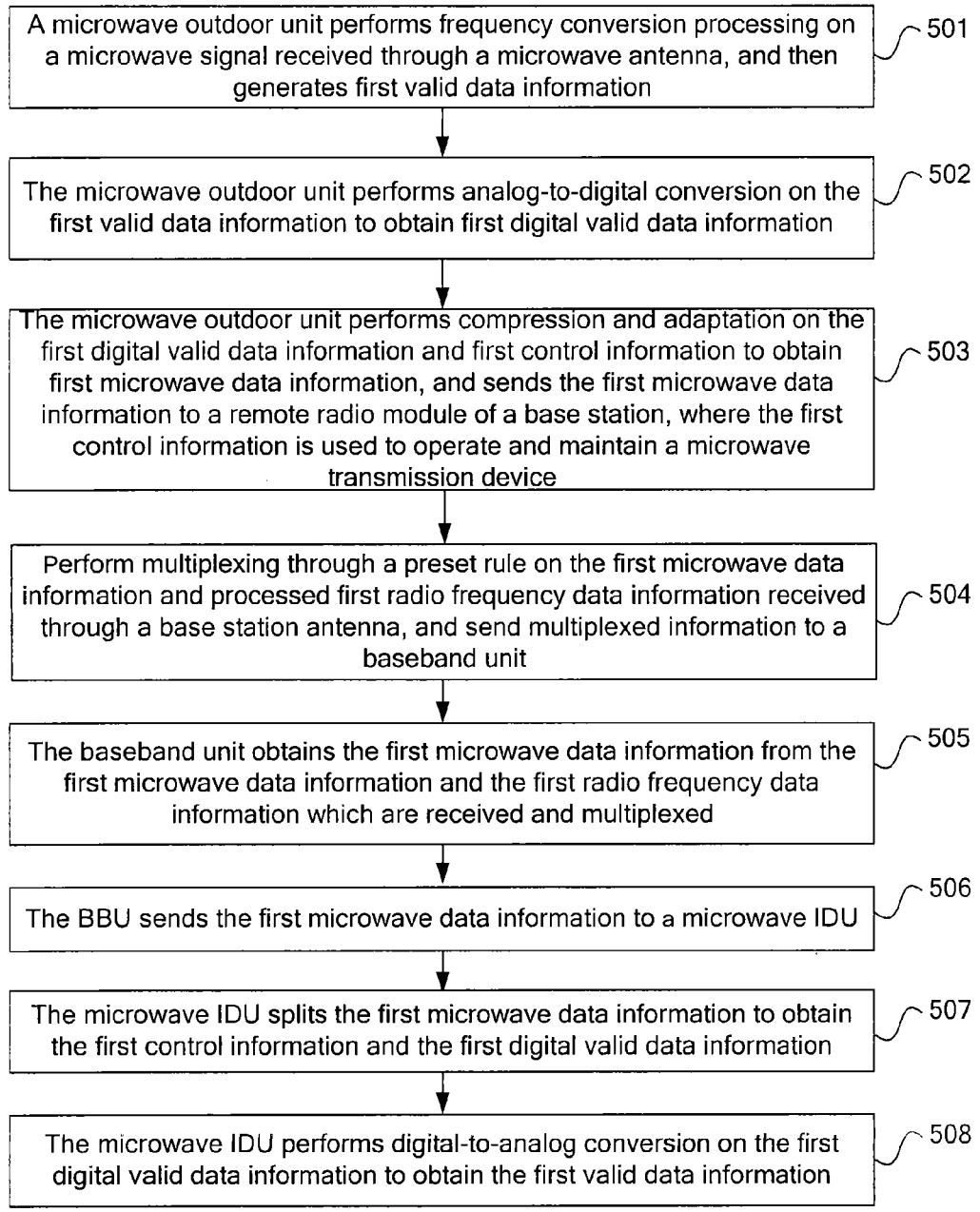
FIG. 5 is a flow chart of a fourth embodiment of a data transmission method according to the present invention.

FIG. 5 is a flow chart of a fourth embodiment of a data transmission method according to the present invention. As shown in FIG. 5, on the basis of a first method embodiment and a second method embodiment, the method specifically includes:

Step 501: A microwave outdoor unit performs frequency conversion processing on a microwave signal received through a microwave antenna, and then generates first valid data information.

The microwave ODU receives the microwave signal through the microwave antenna, and performs frequency conversion processing on the microwave signal through an analog transceiver to generate an IF signal. In this embodiment, the first valid data information is the IF signal.

Step 502: The microwave outdoor unit performs analog-to-digital conversion on the first valid data information to obtain first digital valid data information.

The microwave ODU performs analog-to-digital conversion on the IF signal to obtain the first digital valid data information.

Step 503: The microwave outdoor unit performs compression and adaptation on the first digital valid data information and the first control information to obtain first microwave data information, and sends the first microwave data information to a remote radio unit of a base station, where the first control information is used to operate and maintain a microwave transmission device.

The microwave ODU compresses and combines the first digital valid data information and the first control information, for example, combining the first digital valid data information with the first control information in a time division multiplexing manner, and then performs adaptation processing on the combined signals, for example, performs framing on the combined signals, so that a format of the first microwave data information which is obtained after compression and adaptation satisfies requirements of a transmission channel between the RRU and the BBU, which enables that the first microwave data information can be transmitted through a fiber between the RRU and the BBU, and then the first microwave data information is transmitted to the RRU through a connection fiber between the microwave ODU and the RRU.

Step 501 to step 503 are a process that the first microwave data information is processed and obtained by the microwave outdoor unit.

Step 504: The remote radio unit of the base station performs multiplexing through a preset rule on the first microwave data information and processed first radio frequency data information received through a base station antenna, and sends multiplexed information to the baseband unit.

After the RRU receives the first microwave data information which is received by the microwave ODU through the microwave antenna and processed and obtained by the microwave ODU, the RRU may transmit the first microwave data information together with the first radio frequency data information to the BBU through a fiber in a time division multiplexing manner. It can be understood that, the first microwave data information and the first radio frequency data information may also be transmitted to the BBU through another multiplexing manner, which is not limited in the embodiment of the present invention.

Step 505: The baseband unit obtains the first microwave data information from the first microwave data information and the first radio frequency data information which are received and multiplexed.

The BBU demultiplexes the received information to obtain the first microwave data information.

Step 506: The BBU sends the first microwave data information to the microwave IDU.

Step 507: The microwave IDU splits the first microwave data information to obtain the first control information and the first digital valid data information.

Step 508: The microwave IDU performs digital-to-analog conversion on the first digital valid data information to obtain the first valid data information. In this way, the data transmission from the microwave ODU to the microwave IDU is completed.

Steps 506 to step 508 and step 407 to step 409 in a third method embodiment of the present invention may be mutually replaced.

In this embodiment, the microwave ODU may be improved and extended so as to enable that an interface between the microwave ODU and the microwave IDU converts from an analog interface to a digital interface, and enable that the microwave ODU can share the interface with the RRU for data transmission, namely, enabling that the microwave ODU can be interconnected with the RRU. In addition, because the microwave ODU needs a power supply to provide electricity, a power cable may also exist between the microwave ODU and the RRU so that the microwave ODU can share the power supply with the RRU.

In the data transmission method in this embodiment, the microwave data information and the radio frequency data information are multiplexed, and the multiplexed information is transmitted. In this way, the microwave data information can be transmitted through the fiber between base station devices, thereby saving the connection cable between the microwave transmission devices and reducing a device cost and an installation cost of the microwave transmission device.

Figure 6:
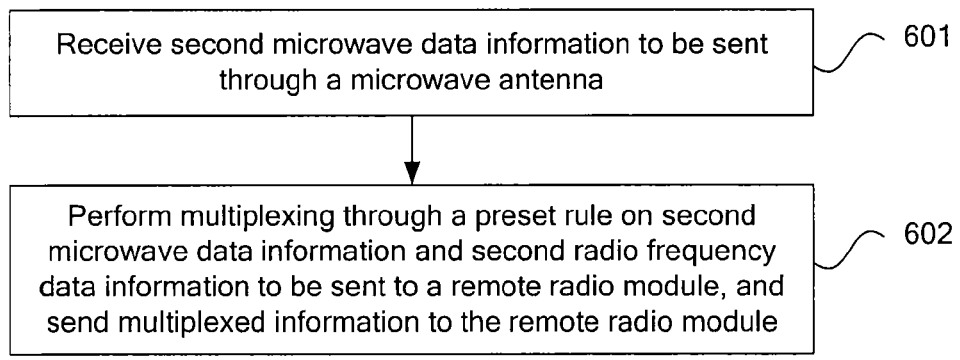
FIG. 6 is a flow chart of a fifth embodiment of a data transmission method according to the present invention.

FIG. 6 is a flow chart of a fifth embodiment of a data transmission method according to the present invention. This embodiment is applicable to a case that the data is transmitted from a microwave IDU to a microwave ODU. As shown in FIG. 6, the method includes:

Step 601: Receive second microwave data information to be sent through a microwave antenna.

In a data transmission process of a microwave device, the microwave IDU needs to transmit data to the microwave ODU so that the microwave ODU sends the data out through the microwave antenna. To enable that the microwave IDU and the microwave ODU can transmit data through a fiber between base stations, it is necessary to perform certain format conversion and adaptation processing on the data transmitted by the microwave IDU to the microwave ODU to obtain microwave data information, so that the microwave data information can be transmitted through the fiber together with radio frequency data information transmitted between base stations. The microwave data information may be obtained in two manners. One manner is: A BBU of a base station performs conversion and adaptation processing on the received data information which is sent by the microwave IDU, to obtain the microwave data information. The other manner is: The microwave IDU performs conversion and adaptation processing on the data information to be sent to the microwave ODU, obtains the microwave data information, and then sends the microwave data information to the BBU of the base station.

Step 602: Perform multiplexing through a preset rule on second microwave data information and second radio frequency data information to be sent to a remote radio unit, and send multiplexed information to the remote radio unit, so that the remote radio unit sends the second microwave data information to the microwave outdoor unit.

In a data transmission process of a base station device, the BBU needs to transmit radio frequency data information to an RRU through the fiber. The BBU performs multiplexing through a preset rule on the radio frequency data information and the microwave data information obtained in step 501, and then the multiplexed information may be sent to the RRU. For example, the BBU transmits the microwave data information together with the radio frequency data information to the RRU through the fiber in a time division multiplexing manner.

After receiving the microwave data information and the radio frequency data information, the RRU demultiplexes the information according to the preset rule to obtain the microwave data information, and then sends the microwave data information to the microwave ODU to complete data transmission between the microwave IDU and the microwave ODU.

In the data transmission method in this embodiment, the microwave data information and the radio frequency data information are multiplexed, and the multiplexed information is transmitted. In this way, the microwave data information can be transmitted through the fiber between base station devices, thereby saving the connection cable between the microwave transmission devices and reducing a device cost and an installation cost of the microwave transmission device.

Figure 7:
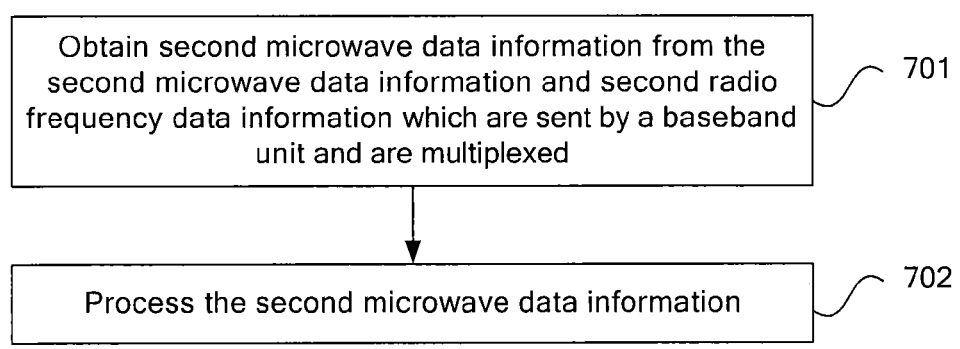
FIG. 7 is a flow chart of a sixth embodiment of a data transmission method according to the present invention.

FIG. 7 is a flow chart of a sixth embodiment of a data transmission method according to the present invention. This embodiment is applicable to a case that data is transmitted from a microwave IDU to a microwave ODU. As shown in FIG. 7, the method specifically includes:

Step 701: Obtain second microwave data information from the second microwave data information and second radio frequency data information which are sent by a baseband unit and are multiplexed.

An RRU receives the second microwave data information and the second radio frequency data information which are sent by a BBU, where the second microwave data information and the second radio frequency data information are sent together by the BBU through a fiber in a multiplexing manner; after receiving the second microwave data information and the second radio frequency data information which are sent by the BBU and are multiplexed, the RRU performs demultiplexing according to a preset rule to obtain the second microwave data information from it.

Step 702: Process the second microwave data information so that the microwave outdoor unit obtains second valid data information and second control information in the second microwave data information.

The RRU processes the obtained second microwave data information, and the processing is performed in two manners. One manner is: The RRU processes the second microwave data information into the second valid data information and the second control information, and then sends the second valid data information and the second control information to the ODU. The other manner is: The RRU sends the second microwave data information to the ODU, so that the ODU processes the second microwave data information into the second valid data information and the second control information.

In the data transmission method of this embodiment, the microwave data information and the radio frequency data information which are multiplexed and transmitted together are received. In this way, microwave data information can be transmitted through a transmission medium between base station devices, such as a fiber, thereby saving a connection cable between microwave transmission devices and reducing a device cost and an installation cost of a microwave transmission device.

Figure 8:
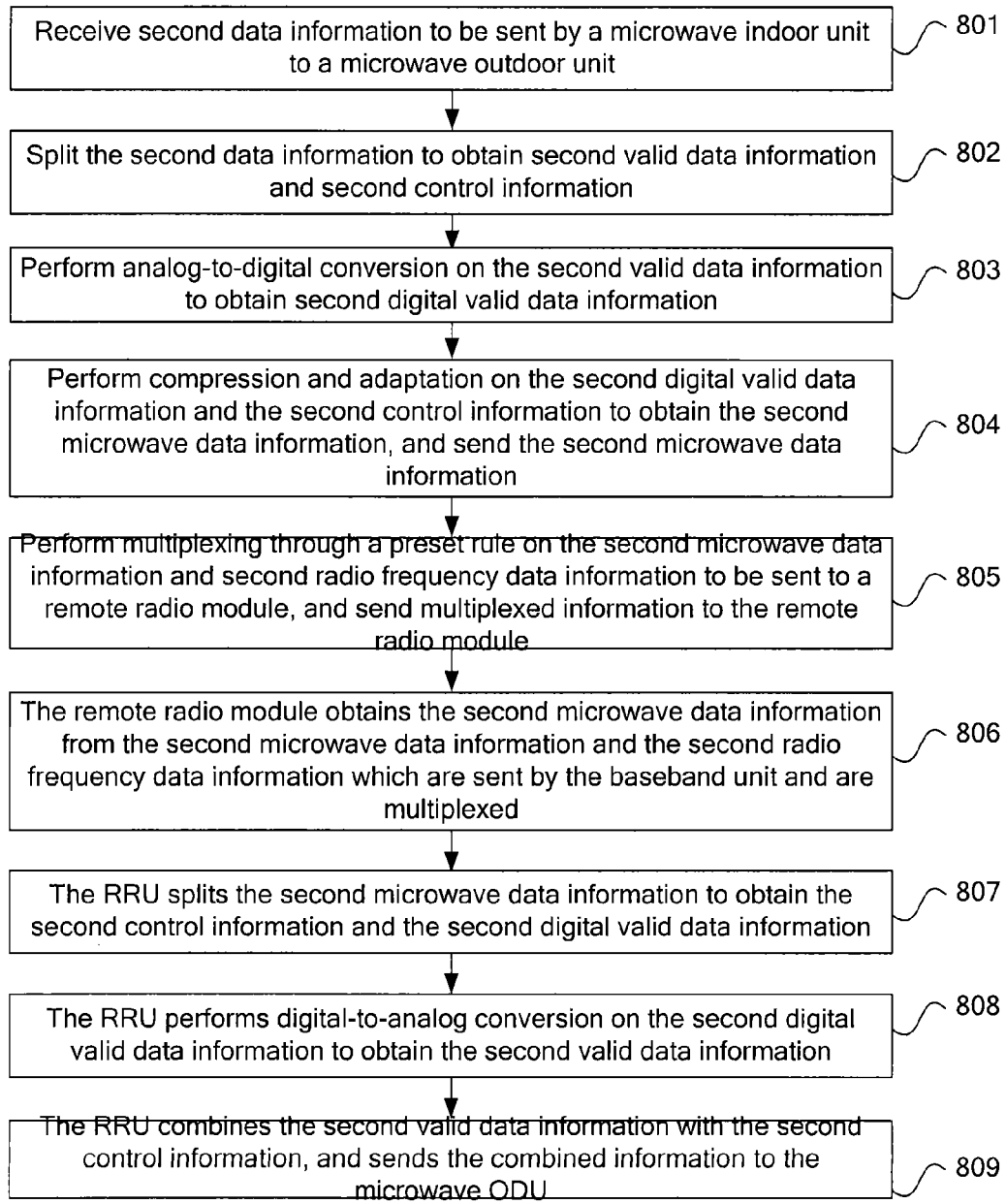
FIG. 8 is a flow chart of a seventh embodiment of a data transmission method according to the present invention.

FIG. 8 is a flow chart of a seventh embodiment of a data transmission method according to the present invention. As shown in FIG. 8, on the basis of a fifth method embodiment and a sixth method embodiment, the method specifically includes:

Step 801: Receive second data information to be sent by a microwave indoor unit to a microwave outdoor unit.

A BBU receives the second data information to be sent by the microwave IDU to the microwave ODU, where the second data information includes an IF signal and second control information. After receiving the IF signal, the microwave ODU processes the IF signal, and sends it out through a microwave antenna; the second control information is used to operate and maintain a microwave transmission device, namely, it is used to perform function configuration, state monitoring and maintenance on the microwave transmission device.

Step 802: Split the second data information to obtain second valid data information and the second control information. The second data information includes the second valid data information and the second control information which is used to operate and maintain the microwave transmission device.

In this embodiment, the second valid data information is the foregoing IF signal. The BBU splits the received second data information to obtain the IF signal and the second control information.

Step 803: Perform analog-to-digital conversion on the second valid data information to obtain second digital valid data information.

The BBU performs analog-to-digital conversion on the separated IF signal to obtain the second digital valid data information.

Step 804: Perform compression and adaptation on the second digital valid data information and the second control information to obtain the second microwave data information, and send the second microwave data information.

The BBU compresses and combines the second digital valid data information and the second control information, and performs adaptation processing on the combined signals so that the obtained second microwave data information can be transmitted through a fiber between the BBU and an RRU, and then the second microwave data information is transmitted to a processing module in the BBU.

Step 805: Perform multiplexing through a preset rule on the second microwave data information and second radio frequency data information to be sent to the remote radio unit, and send the multiplexed information to the remote radio unit.

The processing module in the BBU transmits the second microwave data information together with the second radio frequency data information to the RRU through the fiber in a time division multiplexing manner.

Step 806: The remote radio unit obtains the second microwave data information from the second microwave data information and the second radio frequency data information which are sent by the baseband unit and are multiplexed.

The RRU demultiplexes the information received from the BBU according to a preset rule to obtain the second microwave data information.

Step 807: The RRU splits the second microwave data information to obtain the second control information and the second digital valid data information.

Step 808: The RRU performs digital-to-analog conversion on the second digital valid data information to obtain the second valid data information.

Step 809: The RRU combines the second valid data information with the second control information, and sends the combined information to the microwave ODU. In this way, the data transmission from the microwave IDU to the microwave ODU is completed.

In step 807 to step 809, the RRU processes the second microwave data information into the second valid data information (namely, the IF signal) and control information. In another implementation solution of the embodiment of the present invention, after obtaining the second microwave data information, the RRU may send the second microwave data information to the microwave ODU directly, and the ODU processes the second microwave data information to obtain the IF signal and the second control information.

In the data transmission method of this embodiment, the microwave data information and the radio frequency data information are multiplexed and transmitted together. In this way, the microwave data information can be transmitted through a transmission medium between base station devices, such as the fiber, thereby saving a connection cable between microwave transmission devices and reducing a device cost and an installation cost of the microwave transmission device.

Figure 9:
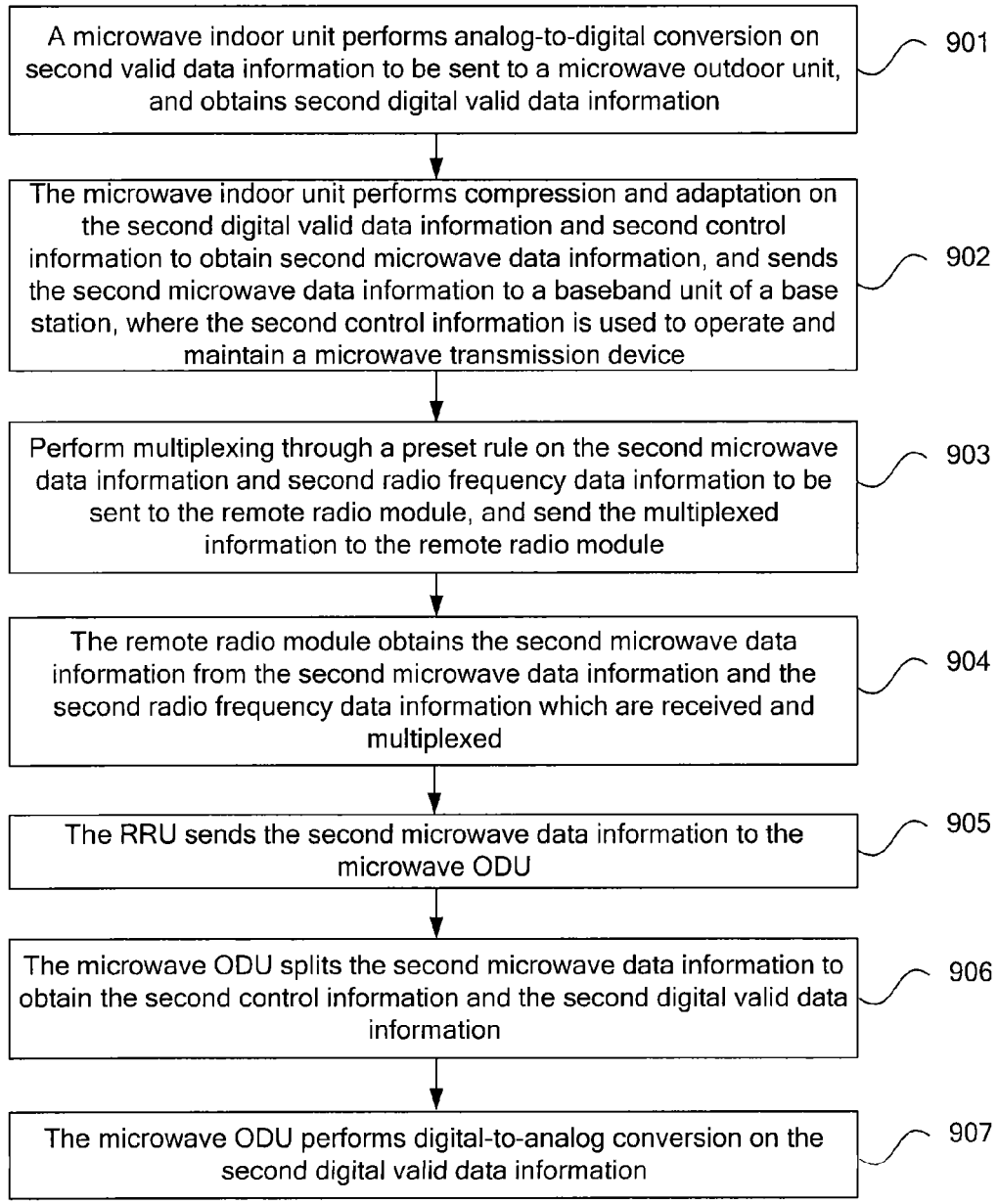
FIG. 9 is a flow chart of an eighth embodiment of a data transmission method according to the present invention.

FIG. 9 is a flow chart of an eighth embodiment of a data transmission method according to the present invention. As shown in FIG. 9, on the basis of a fifth method embodiment and a sixth method embodiment, the method specifically includes:

Step 901: A microwave indoor unit performs analog-to-digital conversion on second valid data information to be sent to a microwave outdoor unit, and obtains second digital valid data information.

The microwave IDU performs analog-to-digital conversion on an IF signal to be sent to the microwave ODU. In this embodiment, the second valid data information may be the IF signal.

Step 902: The microwave indoor unit performs compression and adaptation on the second digital valid data information and second control information to obtain second microwave data information, and sends the second microwave data information to a baseband unit of a base station, where the second control information is used to operate and maintain a microwave transmission device.

The microwave IDU compresses and combines the second digital valid data information and the second control information, and performs adaptation processing on the combined signals so that the obtained second microwave data information can be transmitted through a fiber between the BBU and an RRU, and then the second microwave data information is sent to the BBU.

Step 901 to step 902 are a process that the second microwave data information is processed and obtained by the microwave indoor unit.

Step 903: The BBU performs multiplexing through a preset rule on the second microwave data information and second radio frequency data information to be sent to the remote radio unit, and sends the multiplexed information to the remote radio unit.

After the BBU receives the second microwave data information which is sent by the microwave IDU, is to be sent through a microwave antenna, and is processed and obtained by the microwave IDU, the BBU may transmit the second microwave data information together with the second radio frequency data information to the RRU through the fiber in a time division multiplexing manner.

Step 904: The remote radio unit obtains the second microwave data information from the second microwave data information and the second radio frequency data information which are received and multiplexed.

The RRU demultiplexes the received information to obtain the second microwave data information.

Step 905: The RRU sends the second microwave data information to the microwave ODU.

Step 906: The microwave ODU splits the second microwave data information to obtain the second control information and the second digital valid data information.

Step 907: The microwave ODU performs digital-to-analog conversion on the second digital valid data information to obtain the second valid data information. In this way, the data transmission from the microwave IDU to the microwave ODU is completed.

Steps 905 to step 907 and step 807 to step 809 in a seventh method embodiment of the present invention may be mutually replaced.

In the data transmission method of this embodiment, the microwave data information and the radio frequency data information are multiplexed and transmitted together. In this way, the microwave data information can be transmitted through a transmission medium between base station devices, such as the fiber, thereby saving a connection cable between microwave transmission devices and reducing a device cost and an installation cost of the microwave transmission device.

Persons of ordinary skill in the art should understand that all or a part of steps of the foregoing method embodiments may be completed by a program instructing relevant hardware. The foregoing program may be stored in a computer readable storage medium. When the program runs, the steps of the foregoing method embodiments are executed. The foregoing storage medium includes various media which can store program codes, such as a ROM, a RAM, a magnetic disk, or a compact disk.

Figure 10:
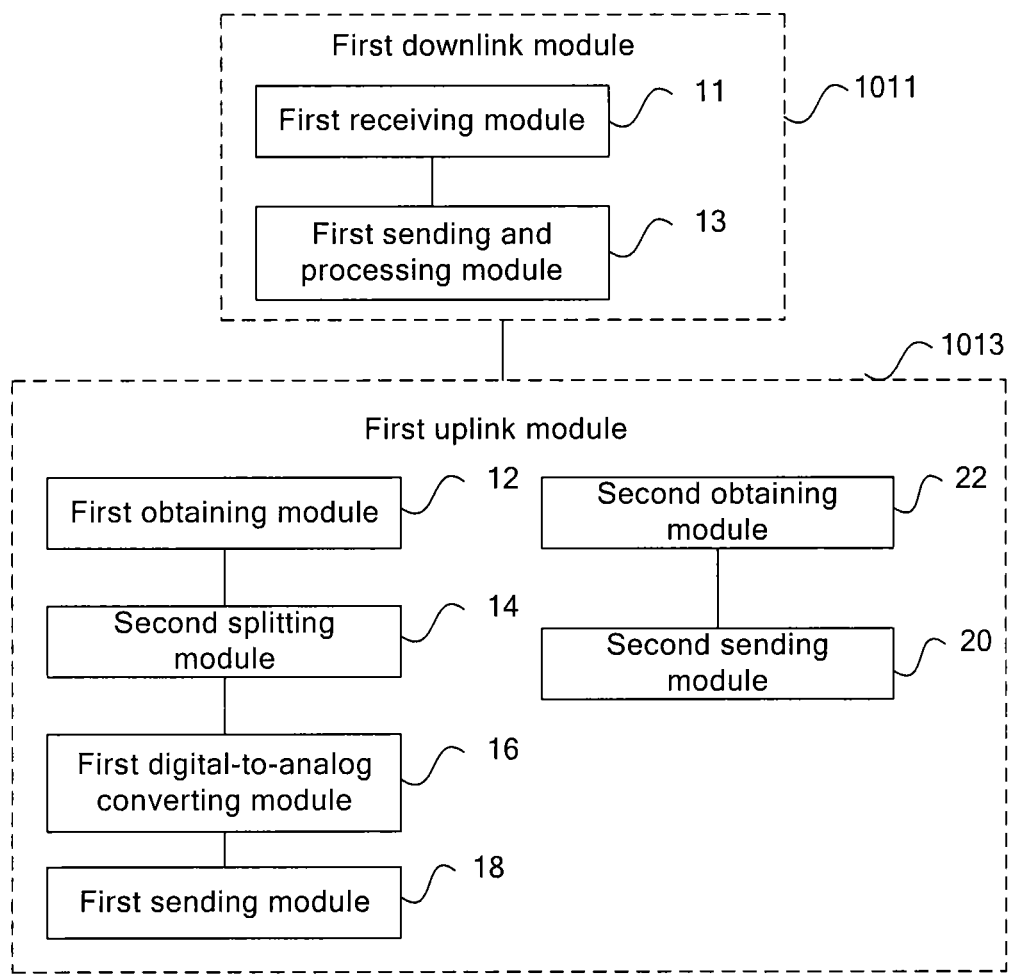
FIG. 10 is a schematic diagram of a first embodiment of a remote radio unit of a base station according to the present invention.

FIG. 10 is a structural diagram of a first embodiment of a remote radio unit of a base station according to the present invention. As shown in FIG. 10, the remote radio unit includes a first downlink module 1011 and/or a first uplink module 1013.

The first downlink module 1011 includes a first receiving module 11 and a first sending and processing module 13.

The first receiving module 11 is configured to receive processed first microwave data information that is received through a microwave antenna. The first sending and processing module 13 is configured to perform multiplexing through a preset rule on the first microwave data information and processed first radio frequency data information that is received through a base station antenna, and send multiplexed information to a baseband unit, so that the baseband unit sends the first microwave data information to a microwave indoor unit.

The first uplink module 1013 includes a first obtaining module 12, a second splitting module 14, a first digital-to-analog converting module 16, and a first sending module 18; or the first uplink module 1013 includes a second obtaining module 22 and a second sending module 20.

The first obtaining module 12 is configured to obtain second microwave data information from the second microwave data information and second radio frequency data information which are sent by the baseband unit and are multiplexed. The second splitting module 14 is configured to split the second microwave data information to obtain second control information and second digital valid data information, where the second control information may be used to operate and maintain a microwave transmission device. The first digital-to-analog converting module 16 is configured to perform digital-to-analog conversion on the second digital valid data information to obtain second valid data information. The first sending module 18 is configured to send the second valid data information and the second control information to a microwave outdoor unit. The second obtaining module 22 is configured to obtain the second microwave data information from the second microwave data information and second radio frequency data information which are sent by the baseband unit and are multiplexed. The second sending module 20 is configured to send the second microwave data information to the microwave outdoor unit.

For working principles and working processes of each module in this embodiment, reference is made to the description in each foregoing method embodiment, which is not repeatedly described here again.

The remote radio unit of the base station in this embodiment multiplexes the microwave data information with the radio frequency data information, and transmits the multiplexed information together. In this way, microwave data information can be transmitted through a fiber between base station devices, thereby saving a connection cable between microwave transmission devices and reducing a device cost and an installation cost of the microwave transmission device.

Figure 11:
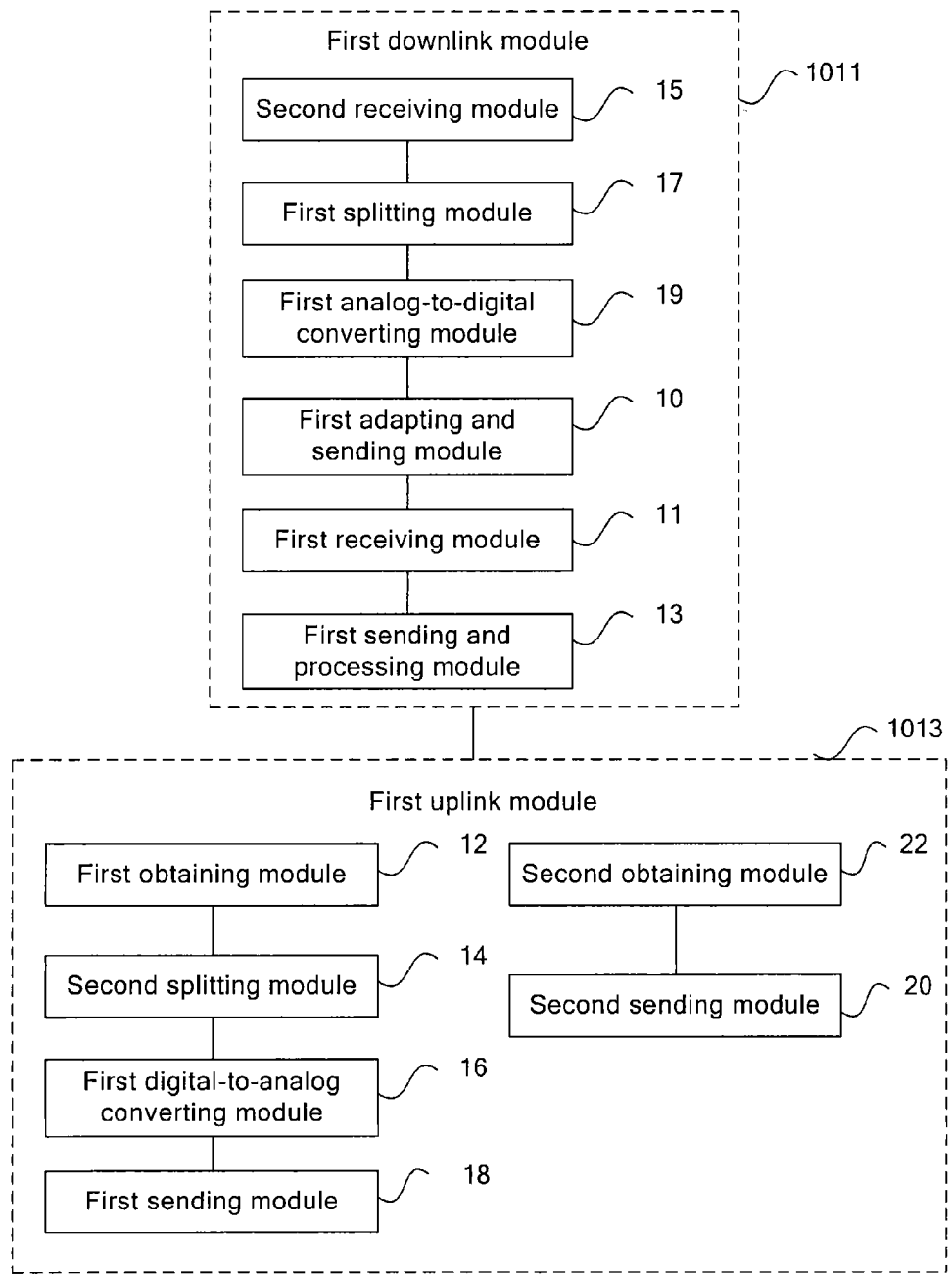
FIG. 11 is a schematic diagram of a second embodiment of a remote radio unit of a base station according to the present invention.

FIG. 11 is a structural diagram of a second embodiment of a remote radio unit of a base station according to the present invention. As shown in FIG. 11, the first downlink module 1011 of the remote radio unit further includes a second receiving module 15, a first splitting module 17, a first analog-to-digital converting module 19, and a first adapting and sending module 10.

The second receiving module 15 is configured to receive first data information that is received by a microwave outdoor unit through a microwave antenna and is used to be sent to a microwave indoor unit. The first splitting module 17 is configured to split the first data information to obtain first valid data information and first control information, where the first data information includes the first valid data information and the first control information which is used to operate and maintain a microwave transmission device. The first analog-to-digital converting module 19 is configured to perform analog-to-digital conversion on the first valid data information to obtain first digital valid data information. The first adapting and sending module 10 is configured to perform compression and adaptation on the first digital valid data information and the first control information to obtain first microwave data information, and send the first microwave data information.

For working principles and working processes of each module in this embodiment, reference is made to the description in each foregoing method embodiment, which is not repeatedly described here again.

The remote radio unit of the base station in this embodiment multiplexes the microwave data information with the radio frequency data information, and transmits the multiplexed information together. In this way, microwave data information can be transmitted through a fiber between base station devices, thereby saving a connection cable between microwave transmission devices and reducing a device cost and an installation cost of the microwave transmission device.

Figure 12:
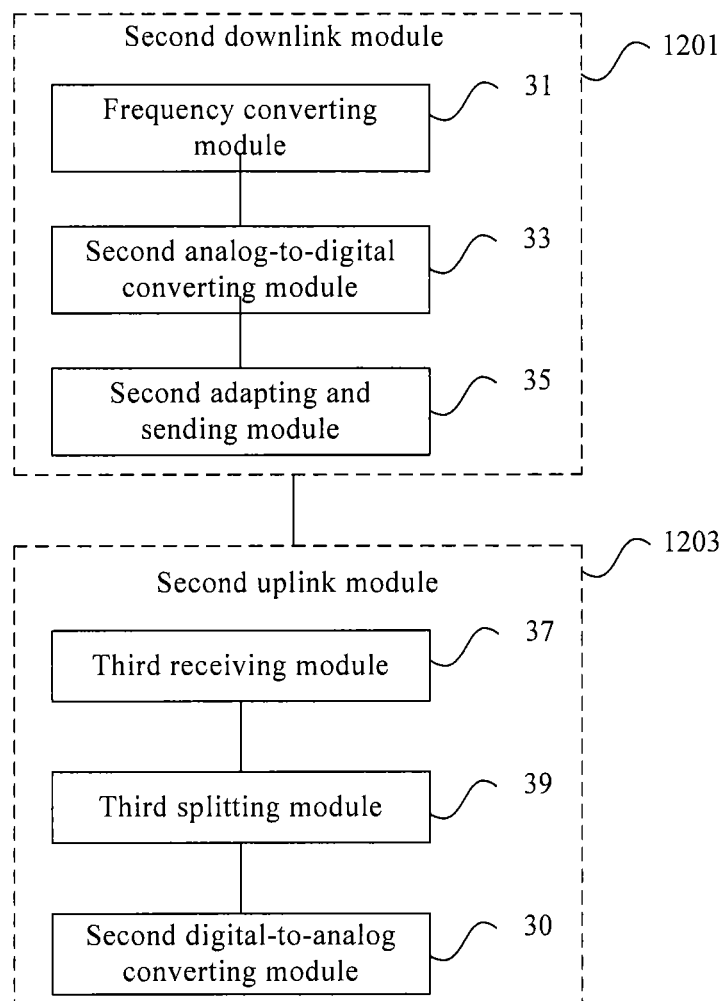
FIG. 12 is a schematic diagram of an embodiment of a microwave outdoor unit according to the present invention.

FIG. 12 is a structural diagram of an embodiment of a microwave outdoor unit according to the present invention. As shown in FIG. 12, the microwave outdoor unit includes a second downlink module 1201 and/or a second uplink module 1203.

The second downlink module 1201 includes: a frequency converting module 31, a second analog-to-digital converting module 33, and a second adapting and sending module 35.

The frequency converting module 31 is configured to perform frequency conversion processing on a microwave signal received through a microwave antenna, and then generate first valid data information. The second analog-to-digital converting module 33 is configured to perform analog-to-digital conversion on the first valid data information to obtain first digital valid data information. The second adapting and sending module 35 is configured to perform compression and adaptation on the first digital valid data information and first control information to obtain first microwave data information, and send the first microwave data information to a remote radio unit of a base station, where the first control information is used to operate and maintain a microwave transmission device.

The second uplink module 1203 includes: a third receiving module 37, a third splitting module 39, and a second digital-to-analog converting module 30.

The third receiving module 37 is configured to receive second microwave data information sent by the remote radio unit of the base station. The third splitting module 39 is configured to split the second microwave data information to obtain second control information and second digital valid data information, where the second control information may be used to operate and maintain the microwave transmission device. The second digital-to-analog converting module 30 is configured to perform digital-to-analog conversion on the second digital valid data information to obtain second valid data information.

For working principles and working processes of each module in this embodiment, reference is made to the description in each foregoing method embodiment, which is not repeatedly described here again.

The microwave outdoor unit in this embodiment converts the microwave signal received through the microwave antenna into microwave data information so that the microwave data information can be multiplexed with radio frequency data information and then transmitted together. In this way, the microwave data information can be transmitted through a fiber between base station devices, thereby saving a connection cable between microwave transmission devices and reducing a device cost and an installation cost of the microwave transmission device.

Figure 13:
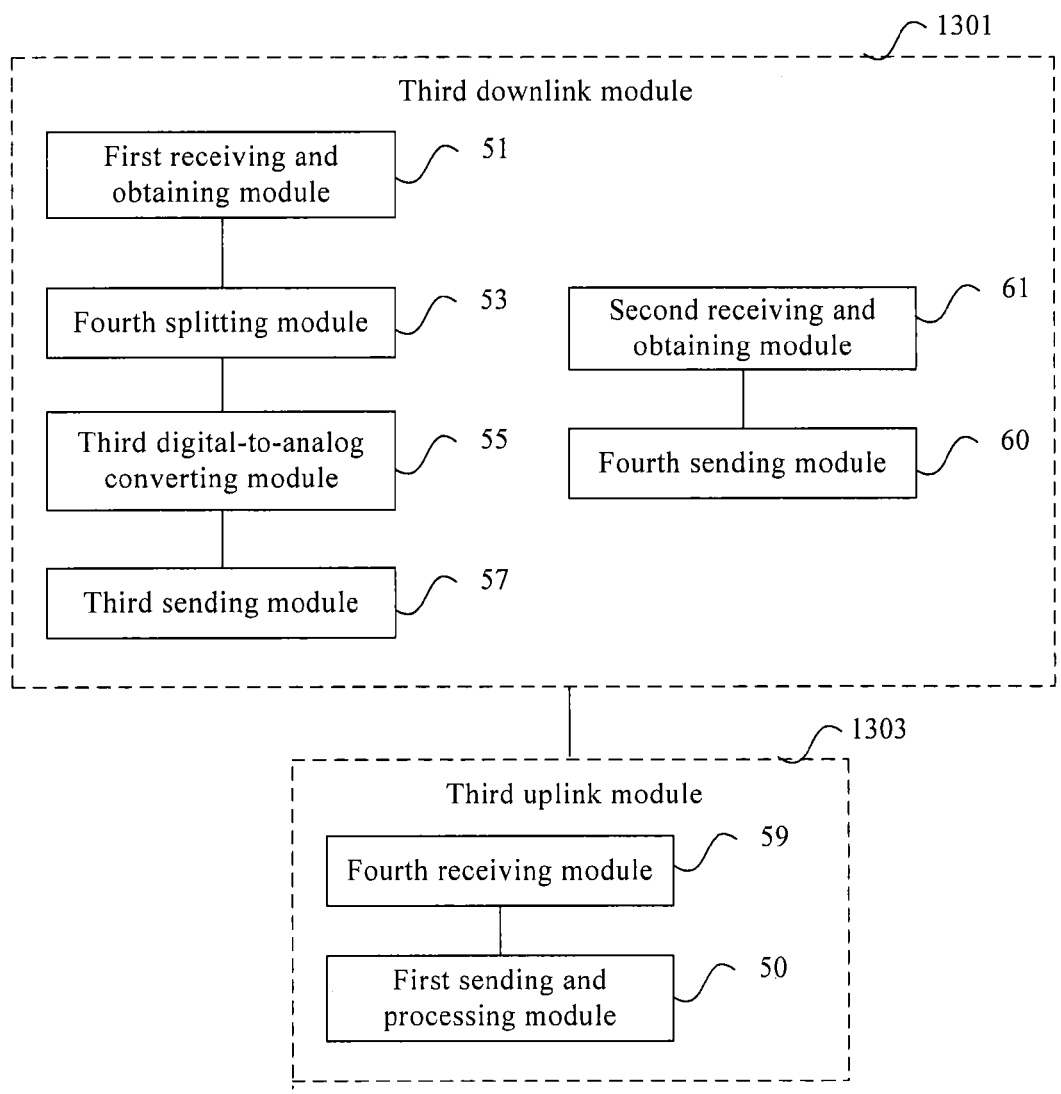
FIG. 13 is a schematic diagram of a first embodiment of a baseband unit of a base station according to the present invention.

FIG. 13 is a structural diagram of a first embodiment of a baseband unit of a base station according to the present invention. As shown in FIG. 13, the baseband unit of the base station includes: a third downlink module 1301 and/or a third uplink module 1303.

The third downlink module 1301 includes: a first receiving and obtaining module 51, a fourth splitting module 53, a third digital-to-analog converting module 55, and a third sending module 57; or, the third downlink module 1301 includes: a second receiving and obtaining module 61 and a fourth sending module 60.

The first receiving and obtaining module 51 is configured to obtain first microwave data information from first microwave data information and first radio frequency data information which are received and multiplexed. The fourth splitting module 53 is configured to split the first microwave data information to obtain first control information and first digital valid data information, where the first control information may be used to operate and maintain a microwave transmission device. The third digital-to-analog converting module 55 is configured to perform digital-to-analog conversion on the first digital valid data information to obtain first valid data information. The third sending module 57 is configured to send the first valid data information and the first control information to a microwave indoor unit. The second receiving and obtaining module 61 is configured to obtain the first microwave data information from the first microwave data information and the first radio frequency data information which are received and multiplexed. The fourth sending module 60 is configured to send the first microwave data information to the microwave indoor unit.

The third uplink module 1303 includes: a fourth receiving module 59 and a first sending and processing module 50.

The fourth receiving module 59 is configured to receive second microwave data information to be sent through a microwave antenna. The first sending and processing module 50 is configured to perform multiplexing through a preset rule on the second microwave data information and second radio frequency data information to be sent to a remote radio unit, and send the multiplexed information to the remote radio unit, so that the remote radio unit sends the second microwave data information to a microwave outdoor unit.

For working principles and working processes of each module in this embodiment, reference is made to the description in each foregoing method embodiment, which is not repeatedly described here again.

The baseband unit of the base station in this embodiment splits the microwave data information and the radio frequency data information which are multiplexed and transmitted together through a fiber between base station devices, and sends the microwave data information obtained by splitting to the microwave indoor unit. In this way, that the microwave transmission device performs data transmission through the fiber is implemented, thereby saving a connection cable between microwave transmission devices and reducing a device cost and an installation cost of the microwave transmission device.

Figure 14:
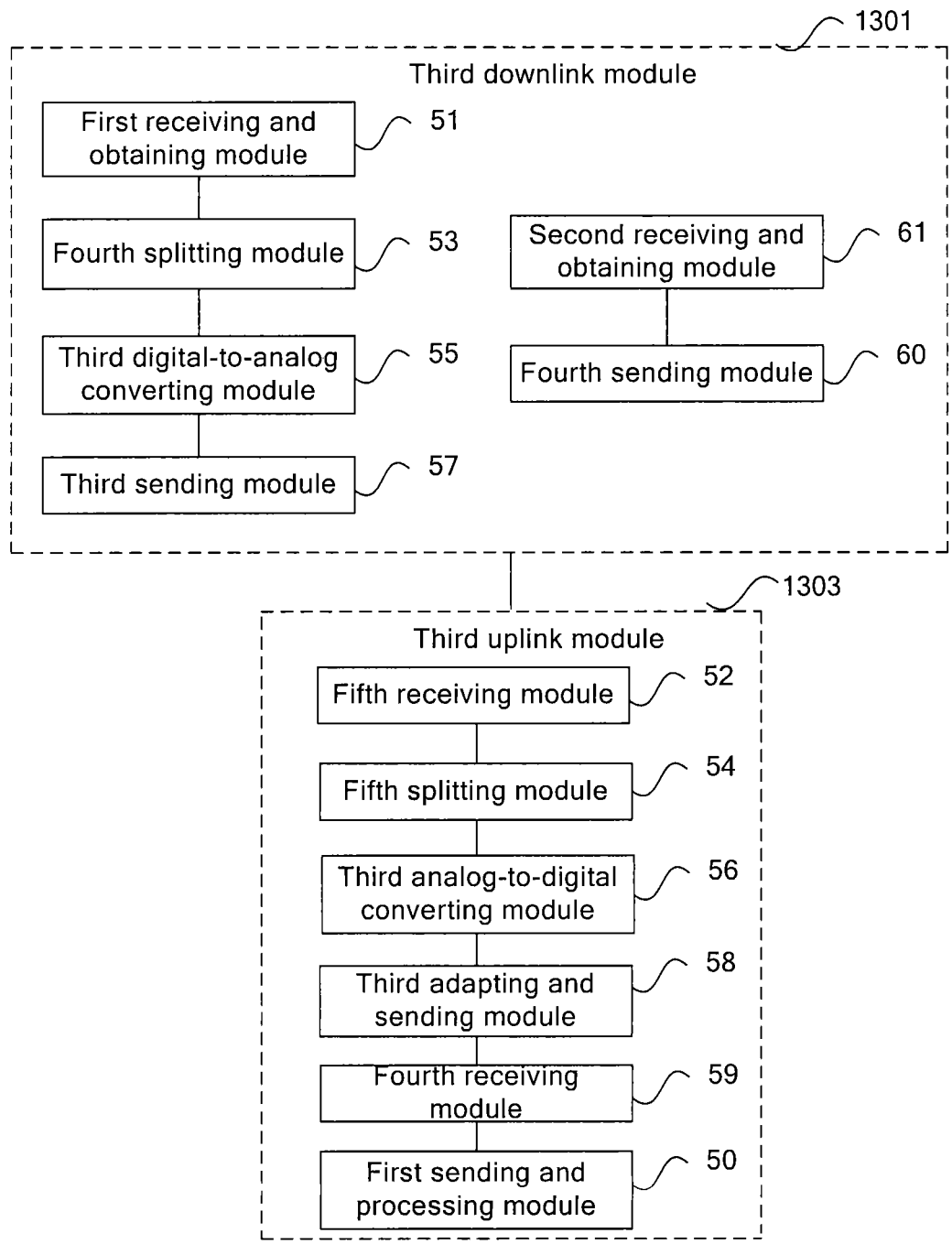
FIG. 14 is a schematic diagram of a second embodiment of a baseband unit of a base station according to the present invention.

FIG. 14 is a structural diagram of a second embodiment of a baseband unit of a base station according to the present invention. As shown in FIG. 14, a third uplink module 1303 of the baseband unit of the base station may further include: a fifth receiving module 52, a fifth splitting module 54, a third analog-to-digital converting module 56, and a third adapting and sending module 58.

The fifth receiving module 52 receives second data information to be sent by a microwave indoor unit to a microwave outdoor unit. The fifth splitting module 54 is configured to split the second data information to obtain second valid data information and second control information, where the second data information includes the second valid data information and the second control information which is used to operate and maintain a microwave transmission device. The third analog-to-digital converting module 56 is configured to perform analog-to-digital conversion on the second valid data information to obtain second digital valid data information. The third adapting and sending module 58 is configured to perform compression and adaptation on the second digital valid data information and the second control information to obtain second microwave data information, and send the second microwave data information.

For working principles and working processes of each module in this embodiment, reference is made to the description in each foregoing method embodiment, which is not repeatedly described here again.

The baseband unit of the base station in this embodiment splits the microwave data information and the radio frequency data information which are multiplexed and transmitted together through a fiber between base station devices, or multiplexes the microwave data information with the radio frequency data information and then transmits the multiplexed information through the fiber. In this way, that the microwave transmission device performs data transmission through the fiber is implemented, thereby saving a connection cable between microwave transmission devices and reducing a device cost and an installation cost of the microwave transmission device.

Figure 15:
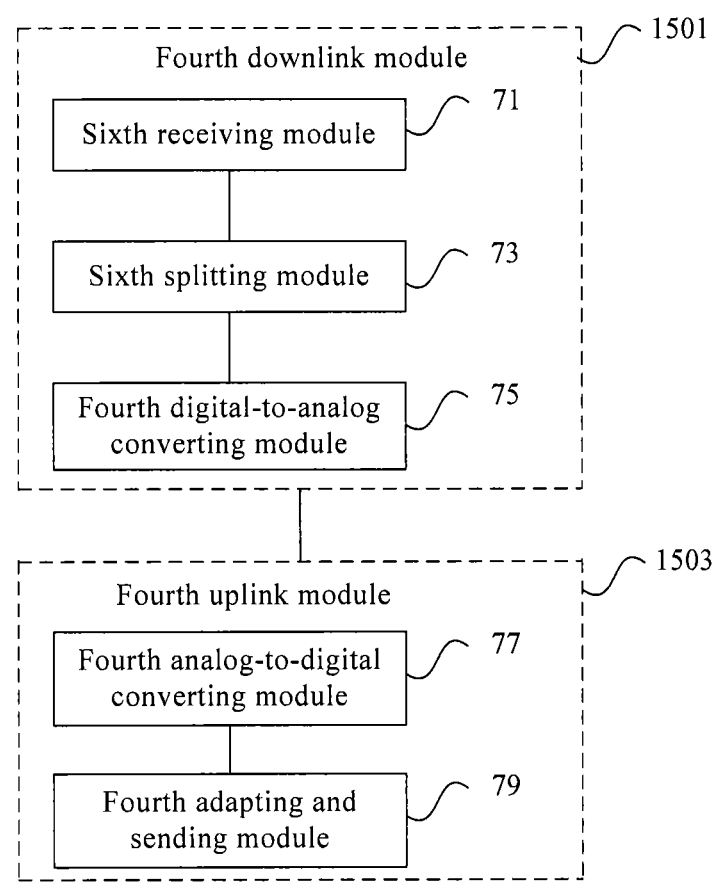
FIG. 15 is a schematic diagram of an embodiment of a microwave indoor unit according to the present invention.

FIG. 15 is a structural diagram of an embodiment of a microwave indoor unit according to the present invention. As shown in FIG. 15, the microwave indoor unit includes: a fourth downlink module 1501 and/or a fourth uplink module 1503.

The fourth downlink module 1501 includes: a sixth receiving module 71, a sixth splitting module 73, and a fourth digital-to-analog converting module 75.

The sixth receiving module 71 is configured to receive first microwave data information sent by a baseband unit. The sixth splitting module 73 is configured to split the first microwave data information to obtain first control information and first digital valid data information, where the first control information may be used to operate and maintain a microwave transmission device. The fourth digital-to-analog converting module 75 is configured to perform digital-to-analog conversion on the first digital valid data information to obtain first valid data information.

The fourth uplink module 1503 includes: a fourth analog-to-digital converting module 77 and a fourth adapting and sending module 79.

The fourth analog-to-digital converting module 77 is configured to perform analog-to-digital conversion on second valid data information to be sent to a microwave outdoor unit, and obtain second digital valid data information. The fourth adapting and sending module 79 is configured to perform compression and adaptation on the second digital valid data information and second control information to obtain second microwave data information, and send the second microwave data information to the baseband unit of a base station, where the second control information is used to operate and maintain the microwave transmission device.

For working principles and working processes of each module in this embodiment, reference is made to the description in each foregoing method embodiment, which is not repeatedly described here again.

The microwave indoor unit in this embodiment splits the microwave data information sent by the baseband unit, and performs digital-to-analog conversion to obtain the valid data information. In this way, that the microwave transmission devices performs data transmission through a fiber is implemented, thereby saving a connection cable between microwave transmission devices and reducing a device cost and an installation cost of the microwave transmission device.

An embodiment of the present invention further provides a data transmission system. The system may include any one of or a corresponding combination of the following: a remote radio unit of a base station according to an embodiment shown in FIG. 10 or FIG. 11, a baseband unit of the base station according to an embodiment shown in FIG. 13 or FIG. 14, a microwave outdoor unit according to an embodiment shown in FIG. 12, and a microwave indoor unit according to an embodiment shown in FIG. 15.

For working principles and working processes of each module in this embodiment, reference is made to the description in each foregoing method embodiment, which is not repeatedly described here again.

The data transmission system which is used in a microwave transmission device in this embodiment multiplexes microwave data information and radio frequency data information, and then transmits multiplexed information together. In this way, the microwave data information can be transmitted through a fiber between base station devices, thereby saving a connection cable between microwave transmission devices and reducing a device cost and an installation cost of the microwave transmission device.

Figure 16:
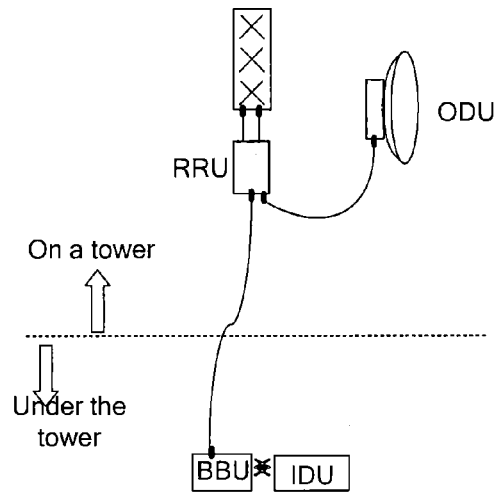
FIG. 16 is a schematic diagram of a first embodiment of a data transmission system according to the present invention.

FIG. 16 is a schematic diagram of an embodiment of a data transmission system according to the present invention. As shown in FIG. 16, the system includes: a remote radio unit (RRU) of a base station, a baseband unit (BBU) of the base station, a microwave outdoor unit (ODU), and a microwave indoor unit (IDU). The microwave outdoor unit which is located on a tower is connected to the remote radio unit, the remote radio unit is connected to the baseband unit under the tower through a fiber, and the baseband unit which is located under the tower is connected to the microwave indoor unit.

The remote radio unit of the base station or the microwave outdoor unit may include: a first downlink processing module and/or a first uplink processing module. That is to say, the first downlink processing module and/or the first uplink processing module may be located in the remote radio unit of the base station, and may also be located in the microwave outdoor unit.

The first downlink processing module is configured to perform frequency conversion on a microwave signal received through a microwave antenna to generate first valid data information, perform analog-to-digital conversion on the first valid data information to obtain first digital valid data information, and perform compression and adaptation on the first digital valid data information and first control information to obtain first microwave data information.

The first uplink processing module is configured to split second microwave data information sent by the baseband unit to obtain second control information and second digital valid data information, and perform digital-to-analog conversion on the second digital valid data information to obtain second valid data information.

The baseband unit of the base station or the microwave indoor unit may include: a second downlink processing module and/or a second uplink processing module. That is to say, the second downlink processing module and/or the second uplink processing module may be located in the baseband unit of the base station, and may also be located in the microwave indoor unit.

The second downlink processing module is configured to split the first microwave data information sent by a radio frequency unit to obtain the first control information and the first digital valid data information, and perform digital-to-analog conversion on the first digital valid data information to obtain the first valid data information.

The second uplink processing module is configured to perform analog-to-digital conversion on the second valid data information to be sent to the microwave outdoor unit, obtain the second digital valid data information, and perform compression and adaptation on the second digital valid data information and the second control information to obtain the second microwave data information.

For working principles and working processes of each module in this embodiment, reference is made to the description in each foregoing method embodiment, which is not repeatedly described here again.

The data transmission system which is used in a microwave transmission device in this embodiment multiplexes the microwave data information with the radio frequency data information, and then transmits multiplexed information together. In this way, the microwave data information can be transmitted through a fiber between base station devices, thereby saving a connection cable between microwave transmission devices and reducing a device cost and an installation cost of the microwave transmission device.

In a data transmission solution provided in each foregoing embodiment of the present invention, the microwave transmission device and a base station device are two independent devices. The ODU and the IDU in the microwave transmission device may transmit data through the fiber between the base station devices. An embodiment of the present invention further provides another data transmission solution. The ODU in the microwave transmission device is integrated in the RRU of the base station; or, both the ODU and the IDU in the microwave transmission device are integrated in the RRU of the base station. The data transmission solution is described in detail in the following through an embodiment.

Figure 17:
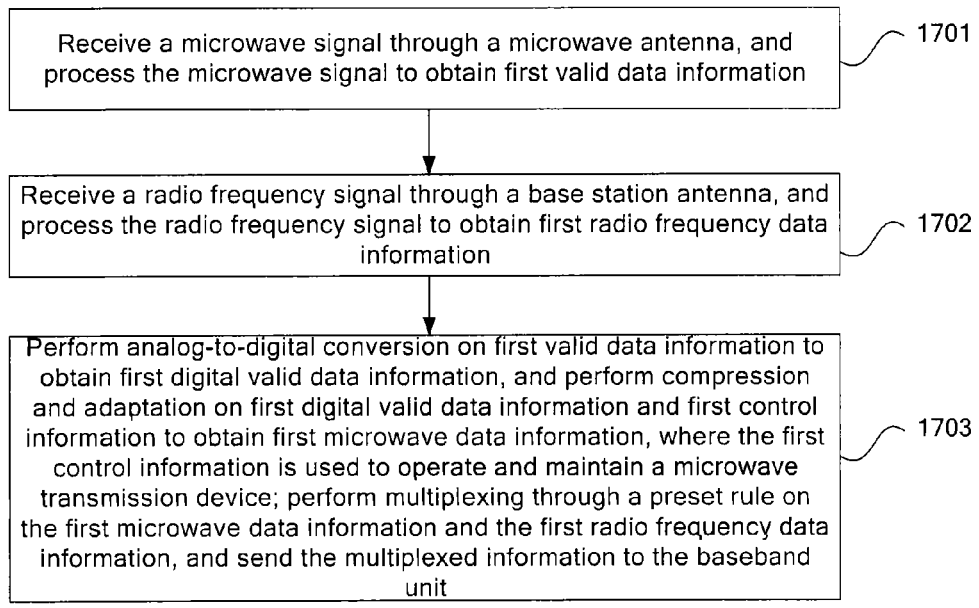
FIG. 17 is a flow chart of a ninth embodiment of a data transmission method according to the present invention.

FIG. 17 is a flow chart of a ninth embodiment of a data transmission method according to the present invention. As shown in FIG. 17, the method includes:

Step 1701: Receive a microwave signal through a microwave antenna, and process the microwave signal to obtain first valid data information.

An executing body of this embodiment is a data transmission device. The data transmission device in this embodiment is a multi-functional device formed by integrating an ODU in a microwave transmission device into an RRU of a base station. That is to say, the RRU and the ODU in any embodiment shown in FIG. 2 to FIG. 9 are integrated and combined together to form the data transmission device in this embodiment. An application scene in this embodiment is: The data transmission device transmits a signal received through the microwave antenna to an IDU in the microwave transmission device through a fiber. A base station device in this embodiment includes a BBU which is of the base station and is located under a tower and the data transmission device which is located on the tower.

The data transmission device receives the microwave signal through the microwave antenna, and the microwave information is processed through an analog transceiver. For example, the analog transceiver processes the microwave signal into an IF signal, and then combines the IF signal with first control information to form first data information. The first control information is used to operate and maintain the microwave transmission device. The first data information is to be sent to the microwave IDU.

Step 1702: Receive a radio frequency signal through a base station antenna, and process the radio frequency signal to obtain first radio frequency data information.

The data transmission device may receive the radio frequency signal through the base station antenna, and process the radio frequency signal to form the first radio frequency data information which can be transmitted in a fiber; and the first radio frequency data information is radio frequency data information to be sent to a baseband unit. This embodiment of the present invention does not restrict the order of step 1701 and step 1702.

Step 1703: Perform analog-to-digital conversion on first valid data information to obtain first digital valid data information, and perform compression and adaptation on the first digital valid data information and the first control information to obtain first microwave data information, where the first control information is used to operate and maintain the microwave transmission device; perform multiplexing through a preset rule on the first microwave data information and the first radio frequency data information, and send the multiplexed information to the baseband unit, so that the baseband unit sends the first microwave data information or the processed first microwave data information to the microwave indoor unit.

In this embodiment, the data transmitted in the fiber is the same as the data transmitted in the fiber in an embodiment shown in FIG. 2, namely, the data transmitted in the fiber is the radio frequency data information and the microwave data information. It can be known by referring to the description in step 201 in the embodiment shown in FIG. 2, to make the first data information be transmitted through the fiber together with the radio frequency data information which is transmitted between base stations, it is necessary to perform certain format conversion and adaptation processing on the first data information to obtain the microwave data information.

The data transmission device splits the first data information to obtain an IF signal and the first control information. The IF signal is the foregoing first valid data information, and the first control information may be a digital signal. The data transmission device performs analog-to-digital conversion on the separated IF signal to obtain the first digital valid data information, and then the data transmission device compresses and combines the first digital valid data information and the first control information, and performs adaptation processing on the combined signal so that the obtained first microwave data information can be transmitted through the fiber.

After obtaining the first microwave data information and the first radio frequency data information, the data transmission device may transmit the first microwave data information together with the first radio frequency data information to the BBU through the fiber in a time division multiplexing manner. After receiving the microwave data information and the radio frequency data information, the BBU demultiplexer the information according to a preset rule to obtain the microwave data information, and then sends the microwave data information to the microwave IDU to complete data transmission between the microwave ODU and the microwave IDU. For the working processes of the BBU and the IDU in this embodiment, reference may be made to the descriptions in the embodiments shown in FIG. 2 to FIG. 9.

In this embodiment of the present invention, the data transmission device multiplexes the microwave data information with the radio frequency data information, and then transmits the multiplexed information together. In this way, the microwave data information can be transmitted through the fiber between base station devices, thereby saving a connection cable between microwave transmission devices and reducing a device cost and an installation cost of the microwave transmission device. Moreover, in this embodiment, the ODU in the microwave transmission device is integrated with the RRU in a base station device, thereby reducing the number of devices; and it is not necessary to consider a strict protection structure of the microwave outdoor device separately, which may further reduce the device cost.

Figure 18:
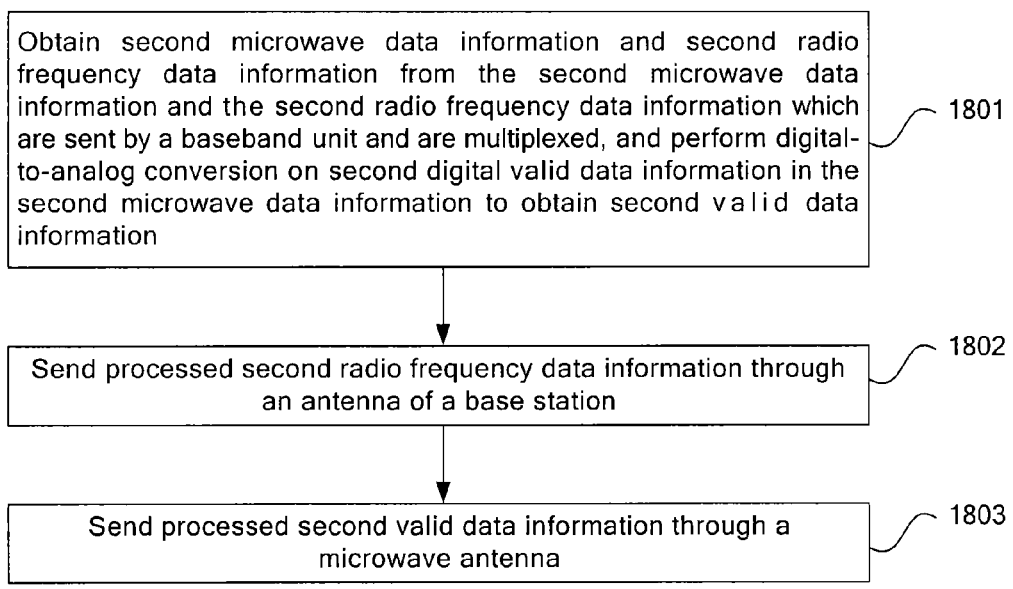
FIG. 18 is a flow chart of a tenth embodiment of a data transmission method according to the present invention.

FIG. 18 is a flow chart of a tenth embodiment of a data transmission method according to the present invention. As shown in FIG. 18, the method includes:

Step 1801: Obtain second microwave data information and second radio frequency data information from the second microwave data information and the second radio frequency data information which are sent by a baseband unit and are multiplexed, and perform digital-to-analog conversion on second digital valid data information in the second microwave data information to obtain second valid data information. The second microwave data information includes the second digital valid data information and second control information which is used to operate and maintain a microwave transmission device.

An executing body of this embodiment is a data transmission device. The data transmission device in this embodiment is a multi-functional device formed by integrating an ODU in the microwave transmission device into an RRU of a base station. That is to say, the RRU and the ODU in any embodiment shown in FIG. 2 to FIG. 9 are integrated and combined together to form the data transmission device in this embodiment. An application scene in this embodiment is: An IDU in the microwave transmission device transmits a microwave signal which is to be sent through a microwave antenna, to the data transmission device through a fiber.

The data transmission device receives the second microwave data information and the second radio frequency data information which are sent by the BBU, where the second microwave data information and the second radio frequency data information are sent together by the BBU through a fiber in a multiplexing manner; after receiving the second microwave data information and the second radio frequency data information which are sent by the BBU and are multiplexed, the data transmission device performs demultiplexing according to a preset rule to obtain the second microwave data information from it. For a process that the BBU sends the second microwave data information and the second radio frequency data information which are multiplexed, reference is made to the description in an embodiment shown in FIG. 6, which is not repeatedly described here again.

And then, the data transmission device processes the obtained second microwave data information, splits the information to obtain the second valid data information and the second control information, and performs digital-to-analog conversion on the second valid data information to obtain the second valid data information.

Step 1802: Send the processed second radio frequency data information through a base station antenna.

After the data transmission device obtains the radio frequency data information, an RRU submodule in the data transmission device processes the radio frequency data information, and sends the information out through the base station antenna. The radio frequency data information is the same as the radio frequency data information transmitted between the BBU and the RRU of the base station in the prior art; and a process of the RRU processing the radio frequency data information is the same as an existing processing process of the RRU. After being processed, the radio frequency data information may be sent out through the base station antenna.

Step 1803: Send the processed second valid data information through a microwave antenna.

An ODU submodule in the data transmission device processes the second valid data information to obtain a signal which can be sent out through the microwave antenna, and sends the signal out through the microwave antenna. The second valid data information is the same as the valid data information transmitted between the IDU and the ODU in the existing microwave transmission device, and a process of the ODU submodule processing the second valid data information is the same as an existing process. The processed second valid data information may be sent out through the microwave antenna. For example, in step 1701 of an embodiment shown in FIG. 17, the ODU submodule receives the microwave signal through the microwave antenna, and the microwave signal is processed into an IF signal by an analog transceiver. In this step, a process of the ODU submodule processing the second valid data information may be a reverse process of the processing in step 1701, namely, the ODU submodule processes the second valid data information into a microwave signal through the analog transceiver.

This embodiment of the present invention does not restrict the order between step 1802 and step 1803.

Through this embodiment of the present invention, the data transmission device receives the microwave data information and the radio frequency data information which are multiplexed and transmitted together. In this way, the microwave data information can be transmitted through a transmission medium between base station devices, such as a fiber, thereby saving a connection cable between microwave transmission devices and reducing a device cost and an installation cost of the microwave transmission device. Moreover, in this embodiment, the ODU in the microwave transmission device is integrated with the RRU in the base station device, thereby reducing the number of devices; and it is not necessary to consider a strict protection structure of the microwave outdoor device separately, which may further reduce the device cost.

It should be noted that in each embodiment of the present invention, when the IDU and the BBU are located together under the tower, the IDU and the BBU may be integrated into one device. When the IDU is integrated with the BBU into one device (the device is called device A under the tower), device A under the tower includes the IDU submodule, the BBU submodule, and a processing submodule. After the processing submodule multiplexes the microwave data sent by the IDU submodule to the ODU with the radio frequency data sent by the BBU to the RRU, the multiplexed information is sent to the device on the tower through the fiber; after the microwave data sent by the ODU to the IDU submodule is multiplexed with the radio frequency data sent by the RRU to the BBU submodule, the multiplexed information is sent to device A under the tower through the fiber. The processing submodule in the device A under the tower demultiplexes the multiplexed data signal, and transmits the demultiplexed signal to the IDU submodule and the RRU submodule, respectively.

Figure 19:
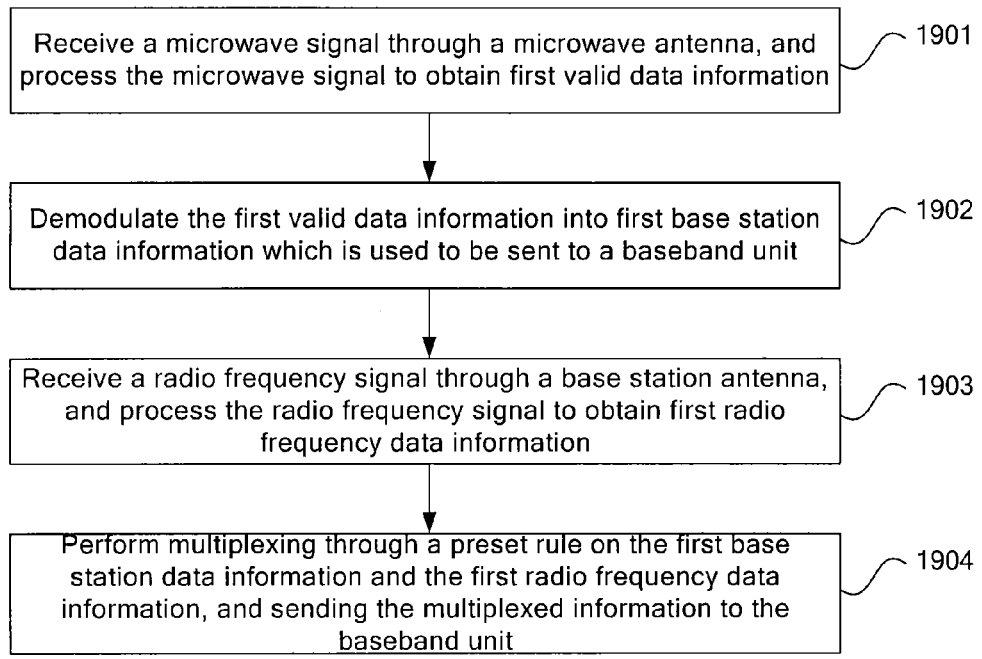
FIG. 19 is a flow chart of an eleventh embodiment of a data transmission method according to the present invention.

FIG. 19 is a flow chart of an eleventh embodiment of a data transmission method according to the present invention. As shown in FIG. 19, the method includes:

Step 1901: Receive a microwave signal through a microwave antenna, and process the microwave signal to obtain first valid data information.

An executing body of this embodiment is a data transmission device. The data transmission device in this embodiment is a multi-functional device which is formed by integrating an ODU and an IDU in a microwave transmission device into an RRU of a base station. Because the ODU and the IDU in the microwave transmission device are integrated and combined with the RRU of the base station, the ODU and the IDU are located on the tower. In this case, data can be transmitted between the ODU and the IDU directly without using a fiber between base station devices for data transmission. In this way, a difference between this embodiment and the embodiments shown in FIG. 17 and FIG. 18 lies in that: In this embodiment, the ODU sends the data received through the microwave antenna to the IDU directly, and the data transmission between the IDU and a BBU needs to be implemented through a fiber between base station devices; in the embodiments shown in FIG. 17 and FIG. 18, the data received by the ODU through the microwave antenna needs to be processed and sent to the IDU through the fiber between base station devices, and the IDU is directly connected to the BBU so that the data can be transmitted between the IDU and the BBU directly.

An application scene in this embodiment is: The data transmission device transmits base station data information in the signal received through the microwave antenna to the BBU through the fiber. A base station device in this embodiment includes the BBU which is of the base station and is located under the tower and the data transmission device which is located on the tower.

The ODU submodule in the data transmission device receives the microwave signal through the microwave antenna, and processes the microwave signal to obtain the first valid data information. The first valid data information is the same as the first valid data information in step 1701 in an embodiment shown in FIG. 17.

Step 1902: Demodulate the first valid data information into first base station data information which is used to be sent to the baseband unit.

The ODU submodule in the data transmission device sends the first data information to the IDU submodule in the data transmission device; and then the IDU submodule demodulates the first data information to obtain base station data information which is used to be sent to the BBU.

Step 1903: Receive a radio frequency signal through a base station antenna, and process the radio frequency signal to obtain first radio frequency data information.

The RRU submodule in the data transmission device may receive the radio frequency signal through the base station antenna, and process the radio frequency signal to form the first radio frequency data information which can be transmitted in the fiber; the first radio frequency data information is the radio frequency data information to be sent to the baseband unit. This embodiment of the present invention does not restrict the order between step 1901 and step 1903.

Step 1904: Perform multiplexing through a preset rule on the first base station data information and the first radio frequency data information, and sending the multiplexed information to the baseband unit.

The base station data information which is processed and obtained by the IDU submodule in the data transmission device needs to be sent to the BBU through the fiber between the base station devices. In this embodiment, the data transmitted in the fiber between the base station devices may include two types: One type is the data transmitted between the RRU submodule and the BBU in the data transmission device, and the data is the radio frequency data information described in each embodiment of the present invention. The other type is the data transmitted between the IDU submodule and the BBU which are in the data transmission device, and the data is called the base station data information in this embodiment. It should be noted that the base station data information may be a digital signal.

After the data transmission device performs multiplexing through a preset rule on the radio frequency data information and the base station data information, the multiplexed information may be sent together to the BBU; the preset rule may be a preset time division multiplexing rule, for example, the processing submodule in the data transmission device transmits the radio frequency data information together with the base station data information to the BBU through the fiber in a time division multiplexing manner; through multiplexing the radio frequency data information and the base station data information, the radio frequency data information and the base station data information can be transmitted in a same transmission medium, for example, both the information is transmitted through one fiber simultaneously.

After receiving the radio frequency data information and the base station data information which are multiplexed, the BBU demultiplexer the information to obtain the radio frequency data information and the base station data information.

In this embodiment of the present invention, the ODU and the IDU are integrated in the data transmission device, so that the ODU and the IDU can transmit data directly, and it is not necessary to transmit the microwave signal through a cable or a fiber between the device on the tower and the device under the tower, thereby saving a connection cable between microwave transmission devices and reducing a device cost and an installation cost of the microwave transmission device. Moreover, in this embodiment, the ODU and the IDU in the microwave transmission device are integrated with the RRU in the base station device, thereby reducing the number of devices; and it is not necessary to consider a strict protection structure of the microwave outdoor device separately, which may further reduce the device cost.

Figure 20:
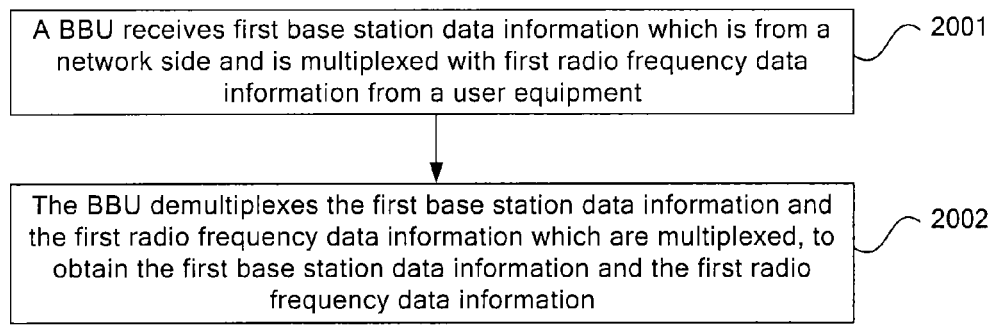
FIG. 20 is a flow chart of a twelfth embodiment of a data transmission method according to the present invention.

FIG. 20 is a flow chart of a twelfth embodiment of a data transmission method according to the present invention. As shown in FIG. 20, the method includes:

Step 2001: A BBU receives first base station data information which is from a network side and is multiplexed with first radio frequency data information from a user equipment.

This embodiment corresponds to an embodiment shown in FIG. 19, and an executing body in this embodiment is the BBU.

Referring to the description in the embodiment shown in FIG. 19, a data transmission device performs multiplexing though a preset rule on radio frequency data information and base station data information, and sends the multiplexed information to the BBU together; the BBU receives the base station data information and the radio frequency data information which are sent by the data transmission device and are multiplexed. The radio frequency data information is the data sent by the user equipment to a base station; and the base station data information is sent by the network side to the base station, namely, it is sent by a base station controller to the base station.

Step 2002: The BBU demultiplexer the first base station data information and the first radio frequency data information which are multiplexed, to obtain the first base station data information and the first radio frequency data information.

The BBU performs demultiplexing according to the preset rule, and obtains the base station data information and the radio frequency data information from the base station data information and the radio frequency data information which are multiplexed. In this way, data transmission is implemented between the IDU and the BBU.

In this embodiment, the BBU receives the radio frequency data information and the base station data information which are multiplexed and transmitted together. In this way, the base station data information can be transmitted through a fiber between base station devices, thereby saving a connection cable between microwave transmission devices and reducing a device cost and an installation cost of a microwave transmission device.

Figure 21:
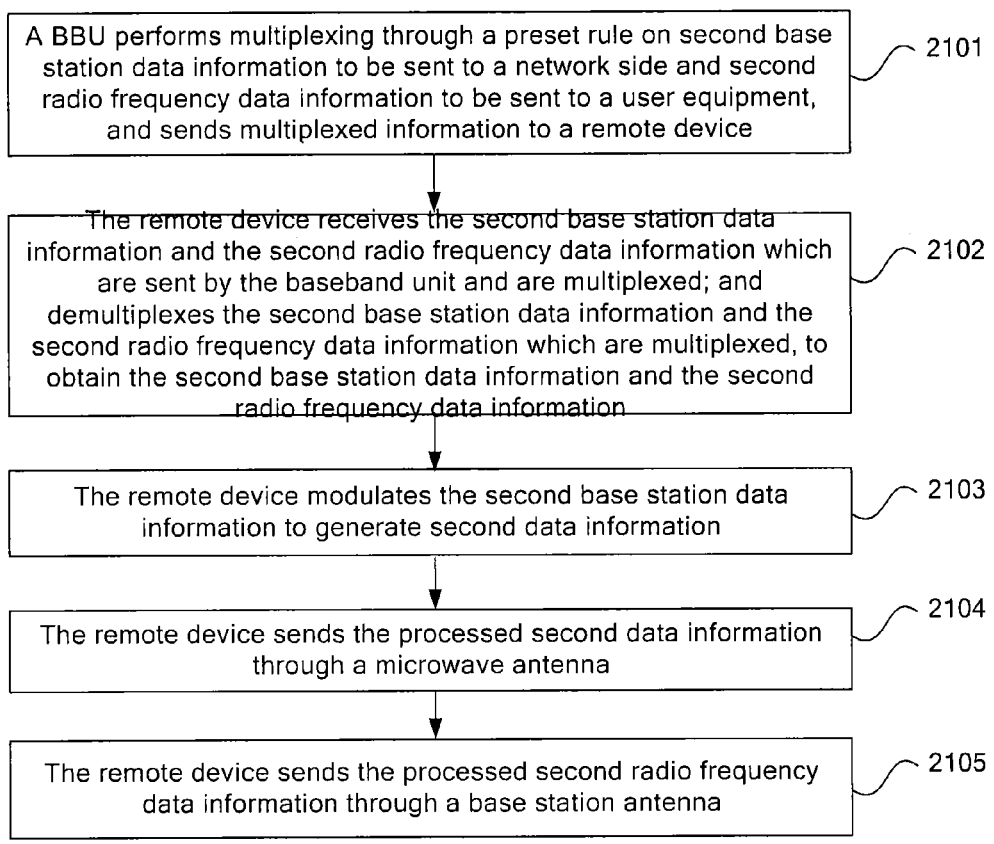
FIG. 21 is a flow chart of a thirteenth embodiment of a data transmission method according to the present invention.

FIG. 21 is a flow chart of a thirteenth embodiment of a data transmission method according to the present invention. As shown in FIG. 21, the method includes:

Step 2101: A BBU performs multiplexing through a preset rule on second base station data information to be sent to a network side and second radio frequency data information to be sent to a user equipment, and sends multiplexed information to a remote device, so that the remote device sends the processed second radio frequency data information to the user equipment through a base station antenna and sends the processed second base station data information to the network side through a microwave antenna.

The remote device in this embodiment may be equivalent to a data transmission device in an embodiment shown in FIG. 19 and FIG. 20. The data transmission device is a multifunctional device which is formed by integrating an ODU and an IDU that are in a microwave transmission device into an RRU of a base station.

An application scene in this embodiment is: The BBU transmits base station data information to the IDU in the data transmission device through a fiber. A base station device in this embodiment includes the BBU which is of the base station and is located under a tower and the data transmission device which is located on the tower.

The ODU and the IDU in the microwave transmission device are located on the tower, and therefore, the BBU needs to send through the fiber the base station data information to an IDU submodule which is in the data transmission device and is located on the tower, and the BBU further needs to send through the fiber radio frequency data information to an RRU submodule which is in the data transmission device and is located on the tower. In this way, the BBU performs multiplexing through a preset rule on the base station data information and the radio frequency data information, for example, the preset rule may be a preset time division multiplexing rule; and then, sends the multiplexed information to the data transmission device through the fiber. In this step, the base station data information sent by the BBU is to be sent to the network side, for example, the base station data information may be sent by the BBU to a base station controller; the radio frequency data information sent by the BBU is to be sent to the user equipment, for example, the radio frequency data information may be sent by the base station to the user equipment.

Step 2102: The remote device receives the second base station data information and the second radio frequency data information which are sent by the baseband unit and are multiplexed; and demultiplexes the second base station data information and the second radio frequency data information which are multiplexed, to obtain the second base station data information and the second radio frequency data information.

The remote device (such as the data transmission device) receives the multiplexed information sent by the BBU, and demultiplexes the multiplexed information so as to obtain the base station data information and the radio frequency data information.

Step 2103: The remote device modulates the second base station data information to generate second data information.

The IDU submodule in the remote device modulates the base station data information to generate the second data information, and sends the second data information to an ODU submodule in the remote device.

Step 2104: The remote device sends the processed second data information through the microwave antenna.

The ODU submodule in the remote device processes the second data information, and sends the processed information to the base station controller through the microwave antenna, so as to complete a process of sending the base station data information from the BBU of the base station to the base station controller.

Step 2105: The remote device sends the processed second radio frequency data information through the base station antenna.

The RRU submodule in the remote device may process the second radio frequency data information, and then, sends the processed second radio frequency data information to the user equipment through the base station antenna, so as to complete a process of sending data information from the BBU of the base station to the user equipment. The process of processing the second radio frequency data information may be a solution in the prior art, which is not limited here.

In this embodiment of the present invention, the ODU and the IDU are integrated in the data transmission device, so that the ODU and the IDU can transmit data directly, and it is not necessary to transmit the microwave signal through a cable or a fiber between a device on the tower and a device under the tower, thereby saving a connection cable between microwave transmission devices and reducing a device cost and an installation cost of the microwave transmission device. Moreover, in this embodiment, the ODU and the IDU in the microwave transmission device are integrated with the RRU in the base station device, thereby reducing the number of devices; and it is not necessary to consider a strict protection structure of the microwave outdoor device separately, which may further reduce the device cost.

Figure 22:
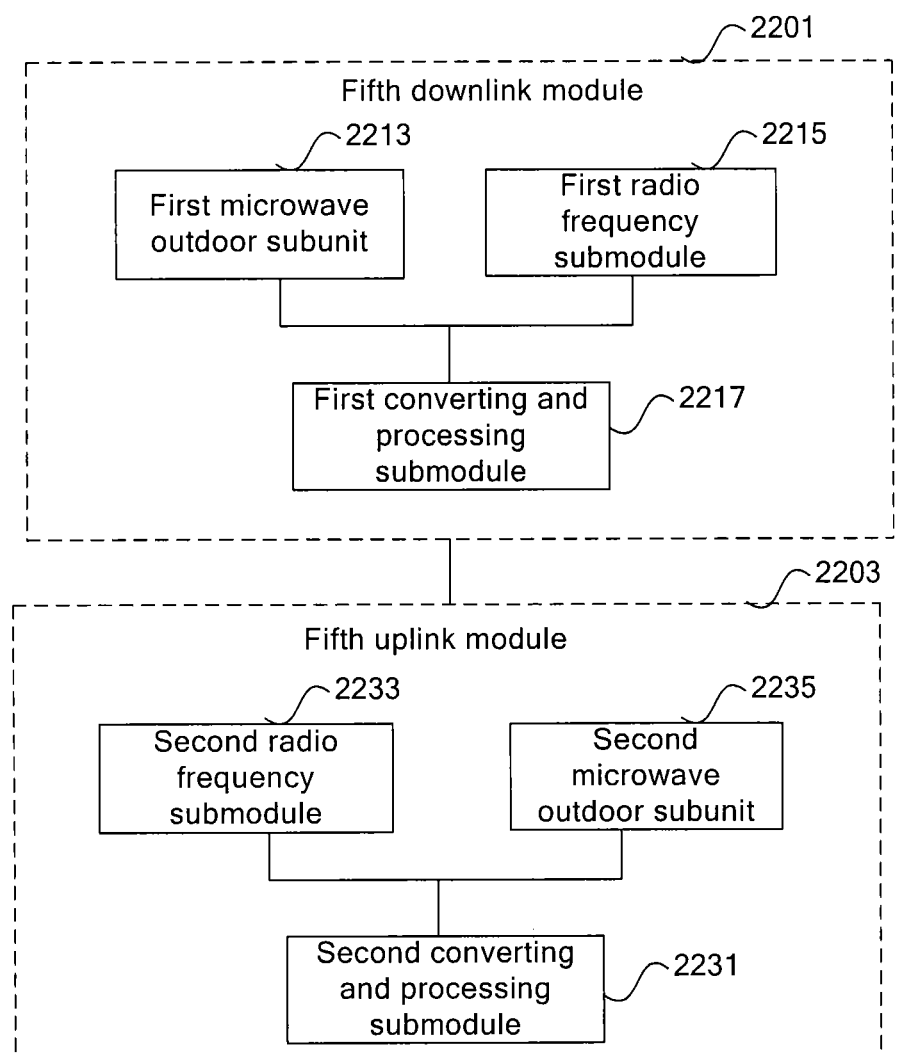
FIG. 22 is a schematic diagram of a first embodiment of a data transmission apparatus according to the present invention.

FIG. 22 is a schematic diagram of a first embodiment of a data transmission apparatus according to the present invention. As shown in FIG. 22, the apparatus includes: a fifth downlink module 2201 and/or a fifth uplink module 2203.

The fifth downlink module 2201 includes: a first microwave outdoor subunit 2213, a first radio frequency submodule 2215, and a first converting and processing submodule 2217.

The first microwave outdoor subunit 2213 is configured to receive a microwave signal through a microwave antenna, and process the microwave signal to obtain first valid data information. The first radio frequency submodule 2215 is configured to receive a radio frequency signal through a base station antenna, and process the radio frequency signal to obtain first radio frequency data information. The first converting and processing submodule 2217 is configured to: perform analog-to-digital conversion on the first valid data information received by the first microwave outdoor subunit to obtain first digital valid data information, and perform compression and adaptation on the first digital valid data information and first control information to obtain the first microwave data information, where the first control information is used to operate and maintain a microwave transmission device; perform multiplexing through a preset rule on the first microwave data information and the first radio frequency data information, and send the multiplexed information to a baseband unit, so that the baseband unit sends the first microwave data information or the processed first microwave data information to a microwave indoor unit.

The fifth uplink module 2203 includes: a second converting and processing submodule 2231, a second radio frequency submodule 2233, and a second microwave outdoor subunit 2235.

The second converting and processing submodule 2231 is configured to obtain second microwave data information and second radio frequency data information from the second microwave data information and the second radio frequency data information which are sent by the baseband unit and are multiplexed, and perform digital-to-analog conversion on the second digital valid data information in the second microwave data information to obtain the second valid data information, where the second microwave data information includes the second digital valid data information and second control information which is used to operate and maintain the microwave transmission device. The second radio frequency submodule 2233 is configured to send the processed second radio frequency data information through the base station antenna. The second microwave outdoor subunit 2235 is configured to send the processed second valid data information through the microwave antenna.

It should be noted that the first converting and processing submodule 2217 and the second converting and processing submodule 2231 may be included in a same function module, the first radio frequency submodule 2215 and the second radio frequency submodule 2233 may be included in a same function module, and the first microwave outdoor subunit 2213 and the second microwave outdoor subunit 2235 may be included in a same function module.

For working principles and working processes of each module in this embodiment, reference is made to the description in method embodiments shown in FIG. 17 and FIG. 18, which is not repeatedly described here again.

In this embodiment of the present invention, the data transmission device multiplexes the microwave data information with the radio frequency data information, and then transmits the multiplexed information together. In this way, the microwave data information can be transmitted through a fiber between base station devices, thereby saving a connection cable between microwave transmission devices and reducing a device cost and an installation cost of the microwave transmission device. Moreover, in this embodiment, the ODU in the microwave transmission device is integrated with an RRU in a base station device, thereby reducing the number of devices; and it is not necessary to consider a strict protection structure of the microwave outdoor device separately, which may further reduce the device cost.

Figure 23:
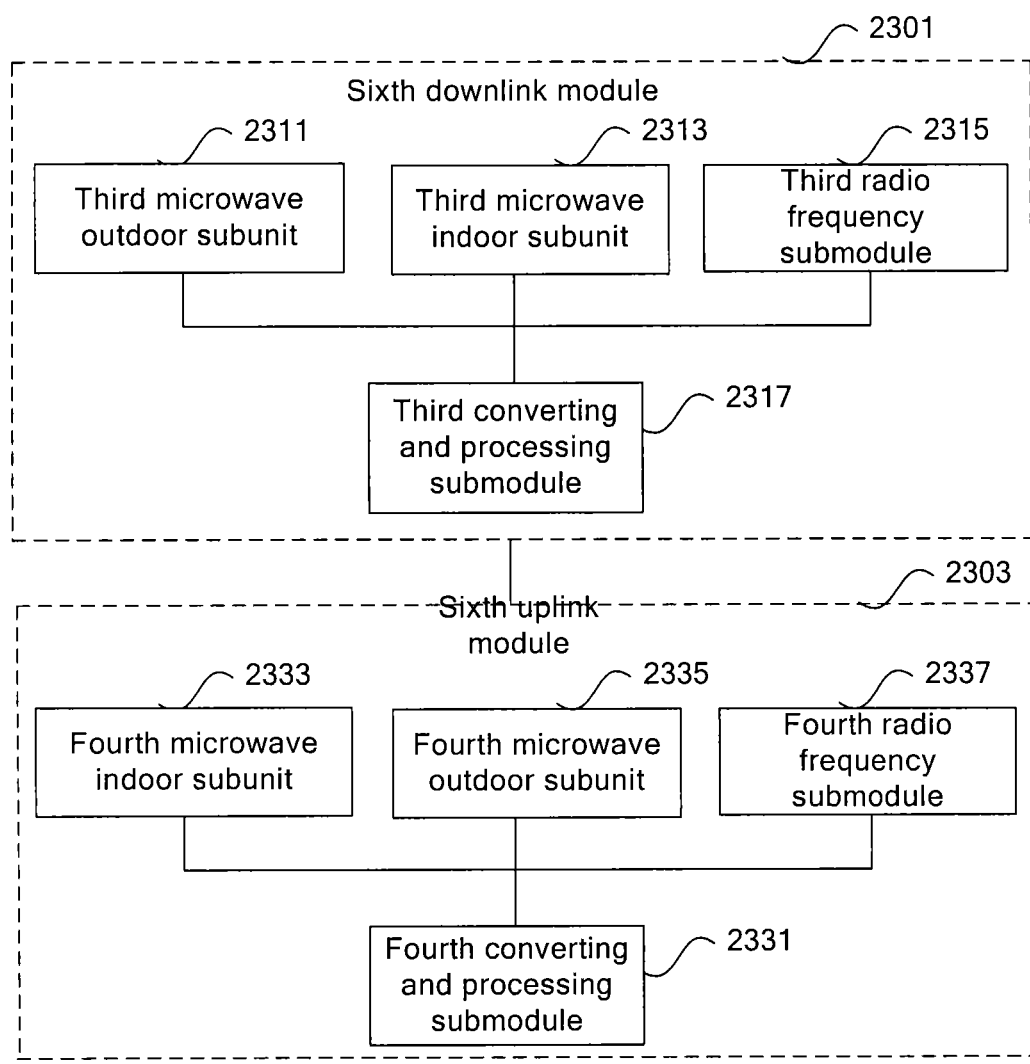
FIG. 23 is a schematic diagram of a second embodiment of a data transmission apparatus according to the present invention.

FIG. 23 is a schematic diagram of a second embodiment of a data transmission apparatus according to the present invention. As shown in FIG. 23, the apparatus includes: a sixth downlink module 2301 and/or a sixth uplink module 2303.

The sixth downlink module 2301 includes: a third microwave outdoor subunit 2311, a third microwave indoor subunit 2313, a third radio frequency submodule 2315, and a third converting and processing submodule 2317.

The third microwave outdoor subunit 2311 is configured to receive a microwave signal through a microwave antenna, and process the microwave signal to obtain first valid data information. The third microwave indoor subunit 2313 is configured to modulate the first valid data information received by the third microwave outdoor subunit into first base station data information which is used to be sent to a baseband unit. The third radio frequency submodule 2315 is configured to receive a radio frequency signal through a base station antenna, and process the radio frequency signal to obtain first radio frequency data information. The third converting and processing submodule 2317 is configured to perform multiplexing through a preset rule on the first base station data information obtained by the third microwave indoor subunit and the first radio frequency data information obtained by the third radio frequency submodule, and send the multiplexed information to the baseband unit.

The sixth uplink module 2303 includes: a fourth converting and processing submodule 2331, a fourth microwave indoor subunit 2333, a fourth microwave outdoor subunit 2335, and a fourth radio frequency submodule 2337.

The fourth converting and processing submodule 2331 is configured to receive second base station data information and second radio frequency data information which are sent by the baseband unit and are multiplexed; demultiplex the second base station data information and the second radio frequency data information which are multiplexed, to obtain the second base station data information and the second radio frequency data information. The fourth microwave indoor subunit 2333 is configured to modulate the second base station data information to generate second data information. The fourth microwave outdoor subunit 2335 is configured to send the processed second data information through the microwave antenna. The fourth radio frequency submodule 2337 is configured to send the processed second radio frequency data information through the base station antenna.

For working principles and working processes of each module in this embodiment, reference is made to the description in an method embodiment shown in FIG. 19 to FIG. 21, which is not repeatedly described here again.

In this embodiment of the present invention, an ODU and an IDU are integrated in a data transmission device, so that the ODU and the IDU can transmit data directly, and it is not necessary to transmit the microwave signal through a cable or a fiber between a device on a tower and a device under the tower, thereby saving a connection cable between microwave transmission devices and reducing a device cost and an installation cost of a microwave transmission device. Moreover, in this embodiment, the ODU and the IDU in the microwave transmission device are integrated with an RRU in a base station device, thereby reducing the number of devices; and it is not necessary to consider a strict protection structure of the microwave outdoor device separately, which may further reduce the device cost.

Figure 24:
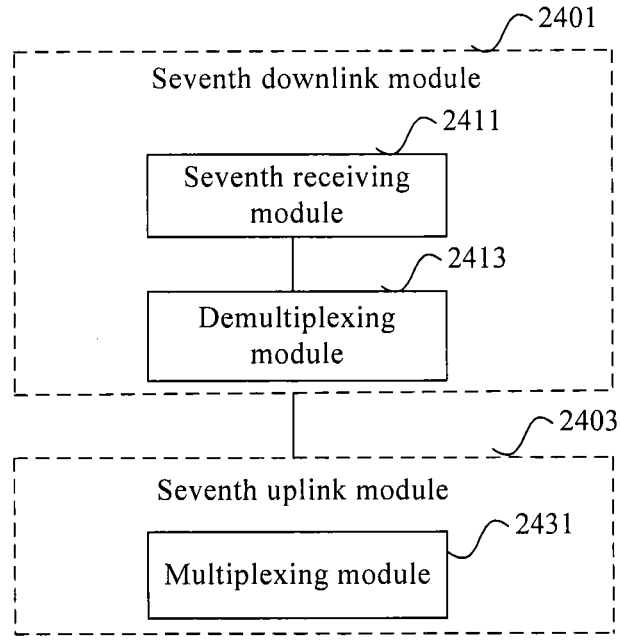
FIG. 24 is a schematic diagram of a third embodiment of a baseband unit of a base station according to the present invention.

FIG. 24 is a schematic diagram of a third embodiment of a baseband unit of a base station according to the present invention. As shown in FIG. 24, the baseband unit of the base station includes: a seventh downlink module 2401 and/or a seventh uplink module 2403.

The seventh downlink module 2401 includes: a seventh receiving module 2411 and a demultiplexing module 2413.

The seventh receiving module 2411 is configured to receive first base station data information which is from a network side and is multiplexed with first radio frequency data information from a user equipment. The demultiplexing module 2413 is configured to demultiplex the first base station data information and the first radio frequency data information which are received by the seventh receiving module and are multiplexed, to obtain the first base station data information and the first radio frequency data information.

The seventh uplink module 2403 includes a multiplexing module 2431.

The multiplexing module 2431 is configured to perform multiplexing through a preset rule on second base station data information to be sent to the network side and second radio frequency data information to be sent to the user equipment, and send the multiplexed information to a remote device.

For working principles and working processes of each module in this embodiment, reference is made to the description in a method embodiment shown in FIG. 19 to FIG. 21, which is not repeatedly described here again.

In this embodiment of the present invention, the BBU receives radio frequency data information and base station data information which are multiplexed and transmitted together, or the BBU multiplexes radio frequency data information with base station data information and sends the multiplexed information to a device on a tower. In this way, the base station data information can be transmitted through a fiber between base station devices, thereby saving a connection cable between microwave transmission devices and reducing a device cost and an installation cost of a microwave transmission device.

Figure 25:
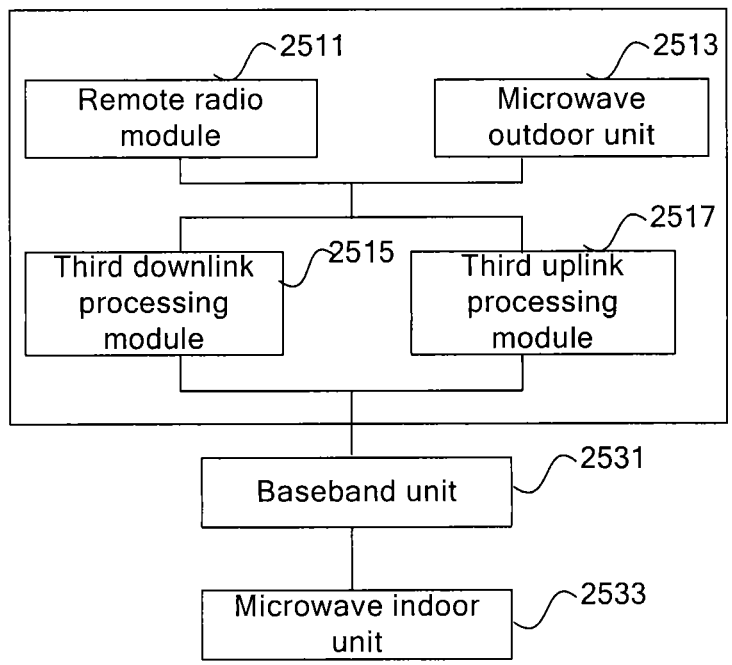
FIG. 25 is a schematic diagram of a first embodiment of a base station device according to the present invention.

FIG. 25 is a schematic diagram of a first embodiment of a base station device according to the present invention. The base station device includes a device on a tower and a device under the tower.

The device on the tower includes a remote radio unit 2511 and a microwave outdoor unit 2513. The device under the tower includes a baseband unit 2531 and a microwave indoor unit 2533. The device on the tower is connected to the baseband unit, and the baseband unit is connected to the microwave indoor unit.

The device on the tower further includes a third downlink processing module 2515 and/or a third uplink processing module 2517.

The third downlink processing module 2515 is configured to multiplex a signal to be sent by the microwave outdoor unit to the microwave indoor unit with a signal to be sent by the remote radio unit to the baseband unit, and send multiplexed signals to the baseband unit.

The third uplink processing module 2517 is configured to demultiplex multiplexed signals sent by the baseband unit, where the multiplexed signals are obtained by multiplexing a signal to be transmitted through a microwave antenna with a signal to be transmitted through a base station antenna, and send the obtained signal to be transmitted through the microwave antenna and the obtained signal to be transmitted through the base station antenna, to the microwave outdoor unit and the remote radio unit, respectively.

The baseband unit 2531 includes: a fourth downlink processing module and/or a fourth uplink processing module.

The fourth downlink processing module is configured to demultiplex a signal to be sent to the microwave indoor unit and a signal to be sent to the baseband unit, where the signals are sent by the device on the tower, and then obtain a signal to be sent to the microwave indoor unit.

The fourth uplink processing module is configured to multiplex the signal to be transmitted through the microwave antenna with the signal to be transmitted through the base station antenna, and send the multiplexed signals to the device on the tower.

The signal to be transmitted through the microwave antenna may be a signal from the microwave indoor unit, and may also be a signal from the microwave indoor unit and processed by the baseband unit.

Specifically, the third downlink processing module 2515 and/or the third uplink processing module 2517, and the remote radio unit 2511 and the microwave outdoor unit 2513 may be integrated in a same device entity; the integrated device entity is equivalent to a data transmission device in an embodiment shown in FIG. 17 or FIG. 18.

For working principles and working processes of each module in this embodiment, reference is made to the description in a method embodiment shown in FIG. 17 and FIG. 18, which is not repeatedly described here again.

In this embodiment of the present invention, the data transmission device multiplexes the microwave data information with the radio frequency data information, and then transmits the multiplexed information together. In this way, the microwave data information can be transmitted through a fiber between base station devices, thereby saving a connection cable between microwave transmission devices and reducing a device cost and an installation cost of a microwave transmission device. Moreover, in this embodiment, the ODU in the microwave transmission device is integrated with the RRU in the base station device, thereby reducing the number of devices; and it is not necessary to consider a strict protection structure of the microwave outdoor device separately, which may further reduce the device cost.

Figure 26:
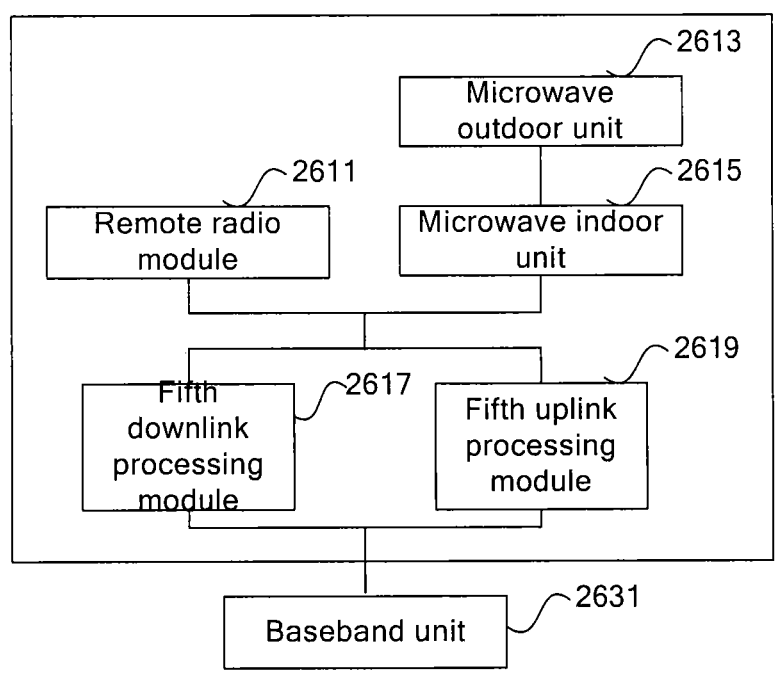
FIG. 26 is a schematic diagram of a second embodiment of a base station device according to the present invention.

FIG. 26 is a schematic diagram of a second embodiment of a base station device according to the present invention. The base station device includes a device on a tower and a device under the tower.

The device on the tower includes a remote radio unit 2611, a microwave outdoor unit 2613, and a microwave indoor unit 2615. The device under the tower includes a baseband unit 2631. The device on the tower is connected to the baseband unit.

The device on the tower further includes a fifth downlink processing module 2617 and/or a fifth uplink processing module 2619.

The fifth downlink processing module 2617 is configured to multiplex a base station data signal to be sent by the microwave indoor unit to the baseband unit with a radio frequency signal to be sent by the remote radio unit to the baseband unit, and then send multiplexed signals to the baseband unit.

The fifth uplink processing module 2619 is configured to demultiplex multiplexed signals sent by the baseband unit, where the multiplexed signals are obtained by multiplexing a signal to be transmitted through a microwave antenna with a signal to be transmitted through a base station antenna, and send the obtained signal to be transmitted through the microwave antenna and the obtained signal to be transmitted through the base station antenna, to the microwave indoor unit and the remote radio unit, respectively.

The baseband unit 2631 further includes: a sixth downlink processing module and/or a sixth uplink processing module.

The sixth downlink processing module is configured to demultiplex a base station data signal and a radio frequency signal that are sent by the fifth downlink processing module and are multiplexed; and the sixth uplink processing module is configured to multiplex a signal to be transmitted through the microwave antenna with a signal to be transmitted through the base station antenna, and send multiplexed signals to the fifth uplink processing module.

Specifically, the fifth downlink processing module 2617 and/or the fifth uplink processing module 2619, and the remote radio unit 2611, the microwave outdoor unit 2613, and the microwave indoor unit 2615 may be integrated in a same device entity; the integrated device entity is equivalent to a data transmission device in an embodiments shown in FIG. 19 to FIG. 21.

For working principles and working processes of each module in this embodiment, reference is made to the description in a method embodiment shown in FIG. 19 to FIG. 21, which is not repeatedly described here again.

In this embodiment of the present invention, the ODU and the IDU are integrated in the data transmission device, so that the ODU and the IDU can transmit data directly, and it is not necessary to transmit the microwave signal through a cable or a fiber between the device on the tower and the device under the tower, thereby saving a connection cable between microwave transmission devices and reducing a device cost and an installation cost of a microwave transmission device. Moreover, in this embodiment, the ODU and the IDU in the microwave transmission device are integrated with the RRU in the base station device, thereby reducing the number of devices; and it is not necessary to consider a strict protection structure of the microwave outdoor device separately, which may further reduce the device cost. In each embodiment of the present invention, the microwave data information and the radio frequency data information may be the data information transmitted in an optical cable between base station devices; the control information is information which is transmitted between the ODU and the IDU and is used to control the microwave transmission device, and the control information may be the same as control information transmitted between the ODU and the IDU in an existing microwave transmission device; the valid data information may be valid information (different from the control information) transmitted between the ODU and the IDU in the existing microwave transmission device through an electrical cable; the digital valid data information is data information obtained by performing analog-to-digital conversion on the valid data information; the radio frequency data information may be data information transmitted between the existing RRU and BBU; and the base station data information may be data information transmitted between the existing base station BBU and a base station controller.

The first microwave data information, the first control information, the first valid data information, and the first digital valid data information are transmitted in a direction from the ODU to the IDU; and the second microwave data information, the second control information, the second valid data information, and the second digital valid data information are transmitted in a direction from the IDU to the ODU.

The first radio frequency data information is transmitted in a direction from the RRU to the BBU; and the second radio frequency data information is transmitted in a direction from the BBU to the RRU. The first base station data information is transmitted in a direction from the BBU to the network side (such as the base station controller); and the second base station data information is transmitted in a direction from the network side (such as the base station controller) to the BBU.

The sequence numbers of the embodiments of the present invention are used to make description clearer, but do not represent that a solution is good or bad.

Finally, it should be noted that the foregoing embodiments are only used to describe the technical solutions of the present invention and not intended to limit the present invention. Although the present invention is described in detail with reference to the foregoing embodiments, persons of ordinary skill in the art should understand that they can still make modifications to the technical solutions recorded in each foregoing embodiment or make equivalent replacements to some technical features of the technical solutions of each foregoing embodiment, and these modifications or replacements do not make the essence of corresponding technical solutions depart from the spirit and scope of the technical solutions of each embodiment of the present invention.

What is claimed is:

1. A data transmission method, comprising:
    obtaining, by a remote radio unit, first microwave data information generated through format conversion and adaptation processing performed on a microwave signal received by a microwave outdoor unit through a microwave antenna; and
    performing, by the remote radio unit, time division multiplexing through a preset rule on the first microwave data information and processed first radio frequency data information to generate multiplexed information wherein,
    the processed first radio frequency data information is generated through processing a radio frequency signal received by a base station antenna,
    sending, by the remote radio unit, the multiplexed information to a baseband unit, for sending the first microwave data information or processed first microwave data information to a microwave indoor unit, wherein,
    the processed first microwave data information, into which the baseband unit processes the first microwave data information, comprises first valid data information and first control information.

2. The data transmission method according to claim 1, wherein the obtaining first microwave data information generated through format conversion and adaptation processing performed on a microwave signal received by a microwave outdoor unit through a microwave antenna comprising:
    receiving first data information sent by the microwave outdoor unit, wherein the first data information comprises first control information used to operate and maintain a microwave transmission device and first valid data information obtained through processing the microwave signal by the microwave outdoor unit;
    splitting the first data information to obtain the first valid data information and the first control information;
    performing analog-to-digital conversion on the first valid data information to obtain first digital valid data information; and
    performing compression and adaptation on the first digital valid data information and the first control information to obtain the first microwave data information.

3. The data transmission method according to claim 1, wherein the obtaining first microwave data information generated through format conversion and adaptation processing performed on a microwave signal received by a microwave outdoor unit through a microwave antenna comprising:
    receiving the first microwave data information, sent by a microwave outdoor unit, wherein the first microwave data information is obtained by the microwave outdoor unit;
    specifically, the first microwave data information is obtained by the microwave outdoor unit further comprising:
        performing, by the microwave outdoor unit, frequency conversion on the microwave signal received through the microwave antenna to generate first valid data information; and
        performing, by the microwave outdoor unit, analog-to-digital conversion on the first valid data information to obtain first digital valid data information, and performing, by the microwave outdoor unit, compression and adaptation on the first digital valid data information and first control information to obtain the first microwave data information, wherein the first control information is used to operate and maintain a microwave transmission device.

4. The data transmission method according to claim 1, further comprising:
    obtaining, by the baseband unit, the first microwave data information from the first microwave data information and the first radio frequency data information, which are multiplexed together and sent by the remote radio unit; and processing the first microwave data information so that the microwave indoor unit obtains the first valid data information and the first control information.

5. The data transmission method according to claim 4, wherein the processing the first microwave data information comprises:
splitting the first microwave data information to obtain first digital valid data information and the first control information used to operate and maintain a microwave transmission device;
performing digital-to-analog conversion on the first digital valid data information to obtain the first valid data information; and
sending the processed first microwave data information, comprising the first valid data information and the first control information, to the microwave indoor unit.

6. The data transmission method according to claim 4, wherein the processing the first microwave data information comprises:
sending the first microwave data information to the microwave indoor unit so that the microwave indoor unit splits the first microwave data information to obtain the first control information and the first digital valid data information, and performs digital-to-analog conversion on the first digital valid data information to obtain the first valid data information.

7. A data transmission method, comprising:
obtaining, by a baseband unit, second microwave data information generated through format conversion and adaptation processing performed on data transmitted by a microwave indoor unit to a microwave outdoor unit; and
performing, by the baseband unit, time division multiplexing through a preset rule on the second microwave data information and second radio frequency data information to be sent to a remote radio unit to generate multiplexed information,
sending, by the baseband unit, the multiplexed information to the remote radio unit, for sending the second microwave data information or processed second microwave data information to a microwave outdoor unit, wherein, the processed second microwave data information, into which the remote radio unit processes the second microwave data information, comprises second valid data information and second control information.

8. The data transmission method according to claim 7, wherein the obtaining the second microwave data information comprises:
receiving second data information sent by the microwave indoor unit, wherein the second data information comprises the second valid data information and the second control information used to operate and maintain a microwave transmission device;
splitting the second data information to obtain the second valid data information and the second control information,
performing analog-to-digital conversion on the second valid data information to obtain second digital valid data information; and
performing compression and adaptation on the second digital valid data information and the second control information to obtain the second microwave data information.

9. The data transmission method according to claim 7, wherein the obtaining the second microwave data information comprises:

receiving the second microwave data information sent by a microwave indoor unit, wherein the second microwave data information is obtained by the microwave indoor unit; and
obtaining the second microwave data information by the microwave indoor unit further comprising:
performing, by the microwave indoor unit, analog-to-digital conversion on second valid data information to obtain second digital valid data information; and
performing, by the microwave indoor unit, compression and adaptation on the second digital valid data information and second control information to obtain the second microwave data information, wherein the second control information is used to operate and maintain a microwave transmission device.

10. The data transmission method according to claim 7, further comprising:
obtaining, by the remote unit, the second microwave data information from the second microwave data information and the second radio frequency data information, which are multiplexed together and sent by the baseband unit; and
processing, by the remote unit, the second microwave data information so that a microwave outdoor unit obtains the second valid data information and the second control information.

11. The data transmission method according to claim 10, wherein the processing the second microwave data information comprises:
splitting the second microwave data information to obtain second digital valid data information and the second control information used to operate and maintain a microwave transmission device;
performing digital-to-analog conversion on the second digital valid data information to obtain the second valid data information; and
sending, the processed second microwave data information, comprising the second valid data information and the second control information to the microwave outdoor unit.

12. The data transmission method according to claim 10, wherein the processing the second microwave data information comprises:
sending the second microwave data information to the microwave outdoor unit so that the microwave outdoor unit splits the second microwave data information to obtain the second control information and second digital valid data information, and performs digital-to-analog conversion on the second digital valid data information to obtain the second valid data information.

13. A remote radio unit of a base station, comprising:
at least one of a first downlink module and a first uplink module, wherein:
the first downlink module comprising:
a first receiving module, configured to receive first microwave data information generated through format conversion and adaptation processing performed on a microwave signal received by a microwave outdoor unit through a microwave antenna; and
a first sending and processing module, configured to perform time division multiplexing through a preset rule on the first microwave data information and processed first radio frequency data information to generate multiplexed information, wherein,
the processed first radio frequency data information is generated through processing radio frequency signal received by a base station antenna, the first sending and processing module is further configured to send multiplexed information to a baseband unit, for sending the first microwave data information or processed first microwave data information to a microwave indoor unit; wherein, the processed first microwave data information, into which the baseband unit processes the first microwave data information, comprises first valid data information and first control information;

the first uplink module comprising:
  a first obtaining module, configured to obtain second microwave data information from the second microwave data information and second radio frequency data information which are multiplexed together and sent by the baseband unit;
  a second splitting module, configured to split the second microwave data information to obtain second control information and second digital valid data information;
  a first digital-to-analog converting module, configured to perform digital-to-analog conversion on the second digital valid data information to obtain second valid data information; and
  a first sending module, configured to send the second valid data information and the second control information to a microwave outdoor unit; or the first uplink module comprising:
  a second obtaining module, configured to obtain second microwave data information from the second microwave data information and second radio frequency data information which are multiplexed together and sent by the baseband unit; and
  a second sending module, configured to process the second microwave data information so that a microwave outdoor unit obtains second valid data information and second control information.

14. The remote radio unit of the base station according to claim 13, wherein the first downlink module further comprises:
  a second receiving module, configured to receive first data information sent by the microwave outdoor unit, wherein the first data information comprises first control information used to operate and maintain a microwave transmission device and first valid data information received through the microwave antenna and processed and obtained by the microwave outdoor unit;
  a first splitting module, configured to split the first data information to obtain the first valid data information and the first control information;
  a first analog-to-digital converting module, configured to perform analog-to-digital conversion on the first valid data information to obtain first digital valid data information; and
  a first adapting and sending module, configured to perform compression and adaptation on the first digital valid data information and the first control information to obtain the first microwave data information, and send the first microwave data information.

15. A microwave outdoor unit, comprising:
at least one of a second downlink module and a second uplink module, wherein
  the second downlink module comprising:
    a frequency converting module, configured to perform frequency conversion processing on a microwave signal received through a microwave antenna, and then generate first valid data information;
    a second analog-to-digital converting module, configured to perform analog-to-digital conversion on the first valid data information to obtain first digital valid data information; and
    a second adapting and sending module, configured to perform compression and adaptation on the first digital valid data information and first control information to obtain first microwave data information, and send the first microwave data information to a remote radio unit of a base station, wherein the first control information is used to operate and maintain a microwave transmission device; and
  the second uplink module comprising:
    a third receiving module, configured to receive second microwave data information sent by the remote radio unit of the base station;
    a third splitting module, configured to split the second microwave data information to obtain second control information and second digital valid data information; and
    a second digital-to-analog converting module, configured to perform digital-to-analog conversion on the second digital valid data information to obtain second valid data information, wherein the second valid data information is used to be processed and then sent out through the microwave antenna.

16. A baseband unit of a base station, comprising:
at least one of a third downlink module and a third uplink module, wherein
  the third downlink module comprising:
    a first receiving and obtaining module, configured to obtain first microwave data information from the first microwave data information and first radio frequency data information which are received and multiplexed;
    a fourth splitting module, configured to split the first microwave data information to obtain first control information and first digital valid data information;
    a third digital-to-analog converting module, configured to perform digital-to-analog conversion on the first digital valid data information to obtain first valid data information; and
    a third sending module, configured to send the first valid data information and the first control information to a microwave indoor unit; or
  the third downlink module comprising:
    a second receiving and obtaining module, configured to obtain first microwave data information from first microwave data information and first radio frequency data information which are received and multiplexed; and
    a fourth sending module, configured to send the first microwave data information to a microwave indoor unit; and
  the third uplink module comprising:
    a fourth receiving module, configured to receive second microwave data information generated through format conversion and adaptation processing performed on data transmitted by a microwave indoor unit to a microwave outdoor unit; and a first sending and processing module, configured to perform time division multiplexing through a preset rule on the second microwave data information and second radio frequency data information to be sent to a remote radio unit to generate multiplexed information, and send the multiplexed information to the remote radio unit, for sending the second microwave data information or processed second microwave data information to a microwave outdoor unit, wherein, the processed second microwave data information, into which the remote radio unit processes the second microwave data information, comprises second valid data information and second control information.

17. The baseband unit of the base station according to claim 16, wherein the third uplink module further comprises:
- a fifth receiving module, configured to receive second data information sent by the microwave indoor unit;
- a fifth splitting module, configured to split the second data information to obtain second valid data information and second control information, wherein the second control information used to operate and maintain a microwave transmission device;
- a third analog-to-digital converting module, configured to perform analog-to-digital conversion on the second valid data information to obtain second digital valid data information; and
- a third adapting and sending module, configured to perform compression and adaptation on the second digital valid data information and the second control information to obtain the second microwave data information, and send the second microwave data information.

18. A microwave indoor unit, comprising:
at least one of a fourth downlink module and a fourth uplink module, wherein the fourth downlink module comprising:
- a sixth receiving module, configured to receive first microwave data information sent by a baseband unit;
- a sixth splitting module, configured to split the first microwave data information to obtain first control information and first digital valid data information; and
- a fourth digital-to-analog converting module, configured to perform digital-to-analog conversion on the first digital valid data information to obtain first valid data information, wherein the first valid data information is used to be processed and then sent to the baseband unit; and the fourth uplink module comprising:
- a fourth analog-to-digital converting module, configured to perform analog-to-digital conversion on second valid data information to obtain second digital valid data information; and
- a fourth adapting and sending module, configured to perform compression and adaptation on the second digital valid data information and second control information to obtain second microwave data information, and send the second microwave data information to the baseband unit of a base station, wherein the second control information is used to operate and maintain a microwave transmission device.

\* \* \* \* \*